(12) United States Patent
Hirosawa

(10) Patent No.: US 10,775,663 B2
(45) Date of Patent: Sep. 15, 2020

(54) DISPLAY DEVICE

(71) Applicant: Japan Display Inc., Minato-ku (JP)

(72) Inventor: Jin Hirosawa, Tokyo (JP)

(73) Assignee: Japan Display Inc., Minato-ku (JP)

( * ) Notice: Subject to any disclaimer, the term of this patent is extended or adjusted under 35 U.S.C. 154(b) by 320 days.

(21) Appl. No.: 15/942,630

(22) Filed: Apr. 2, 2018

(65) Prior Publication Data

US 2018/0292704 A1 Oct. 11, 2018

(30) Foreign Application Priority Data

Apr. 5, 2017 (JP) ................... 2017-075159

(51) Int. Cl.
| | | |
|---|---|---|
| *G02B 5/22* | (2006.01) | |
| *G02F 1/1335* | (2006.01) | |
| *G02F 1/1339* | (2006.01) | |
| *G02F 1/1362* | (2006.01) | |

(Continued)

(52) U.S. Cl.
CPC .... *G02F 1/133512* (2013.01); *G02F 1/13394* (2013.01); *G02F 1/133514* (2013.01); *G02F 1/1368* (2013.01); *G02F 1/134363* (2013.01); *G02F 1/136227* (2013.01); *G02F 2001/13396* (2013.01); *G02F 2001/134372* (2013.01); *G02F 2201/52* (2013.01)

(58) Field of Classification Search
CPC . G02B 5/201; G02B 5/20; G02B 5/22; G02B 5/223; G02B 5/23; G02B 5/286; G02B 26/008; G02B 1/04; G02B 7/006; H01L 27/14621; H01L 27/14685; H01L 27/322; G02F 1/133514; G02F 1/133516; G02F 1/133512; G02F 1/13338; G02F 1/13394; G02F 2001/133519; G02F 2001/121
USPC ........ 359/237–240, 242, 245–246, 250–252, 359/265–271, 290–298, 885–892; 349/38–40; 345/107
See application file for complete search history.

(56) References Cited

U.S. PATENT DOCUMENTS

| | | | |
|---|---|---|---|
| 10,020,330 B2 * | 7/2018 | Kurokawa | .......... H01L 27/1464 |
| 2008/0284839 A1 * | 11/2008 | Tsujino | .................... B41J 2/451 347/238 |
| 2012/0327338 A1 | 12/2012 | Kobayashi et al. | |

(Continued)

FOREIGN PATENT DOCUMENTS

| | | |
|---|---|---|
| JP | 2013-7955 | 1/2013 |
| JP | 2014-2385 | 1/2014 |

*Primary Examiner* — William R Alexander
*Assistant Examiner* — Tamara Y. Washington
(74) *Attorney, Agent, or Firm* — Oblon, McClelland, Maier & Neustadt, L.L.P.

(57) ABSTRACT

According to one embodiment, a display device comprises first to sixth opening portions and first to third light-shielding portions, the first light-shielding portion being adjacent to the first and second opening portions, the first opening portion having an area larger than an area of the second opening portion, the second light-shielding portion being adjacent to the third and fourth opening portions, the third and fourth opening portions each having substantially an equal area to the first opening portion, the third light-shielding portion being adjacent to the fifth and sixth opening portions, the fifth and sixth opening portions each having substantially an equal area to the second opening portion.

20 Claims, 14 Drawing Sheets

(51) Int. Cl.
    *G02F 1/1368*     (2006.01)
    *G02F 1/1343*     (2006.01)

(56) References Cited

U.S. PATENT DOCUMENTS

| | | |
|---|---|---|
| 2013/0342795 A1 | 12/2013 | Park et al. |
| 2015/0346866 A1* | 12/2015 | Kusunoki ........... G06F 15/0216 345/174 |
| 2016/0109751 A1* | 4/2016 | Nakagawa ........ G02F 1/133512 349/106 |
| 2016/0202531 A1 | 7/2016 | Park et al. |
| 2016/0342004 A1 | 11/2016 | Kobayashi et al. |
| 2017/0052405 A1* | 2/2017 | Yu ....................... G02F 1/13394 |
| 2018/0088401 A1* | 3/2018 | Lin .......................... G02F 1/23 |
| 2018/0149932 A1* | 5/2018 | Nakamura ........ G02F 1/133512 |
| 2018/0275468 A1* | 9/2018 | Hirosawa .......... G02F 1/136286 |
| 2019/0074302 A1* | 3/2019 | Gao ................. H01L 29/78633 |
| 2019/0324580 A1* | 10/2019 | Tanaka ................... H01L 51/56 |

* cited by examiner

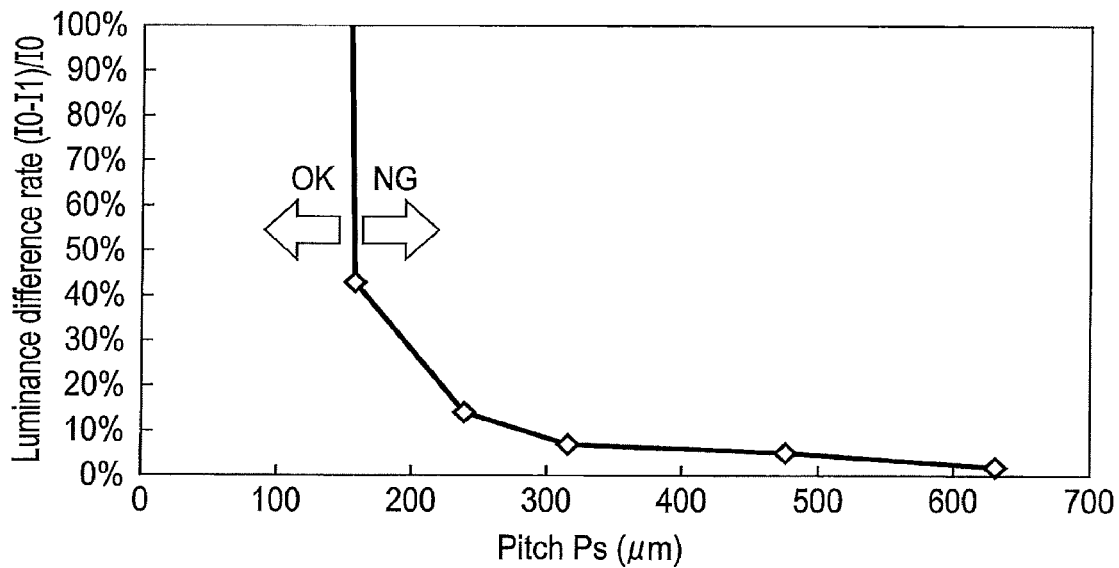
F I G. 6A
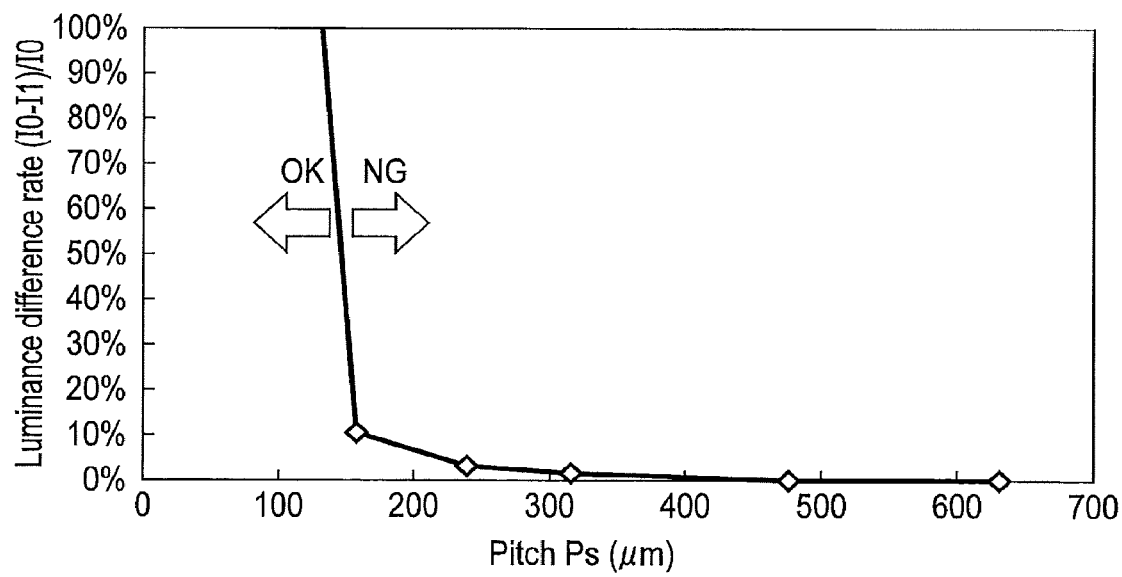
F I G. 6B

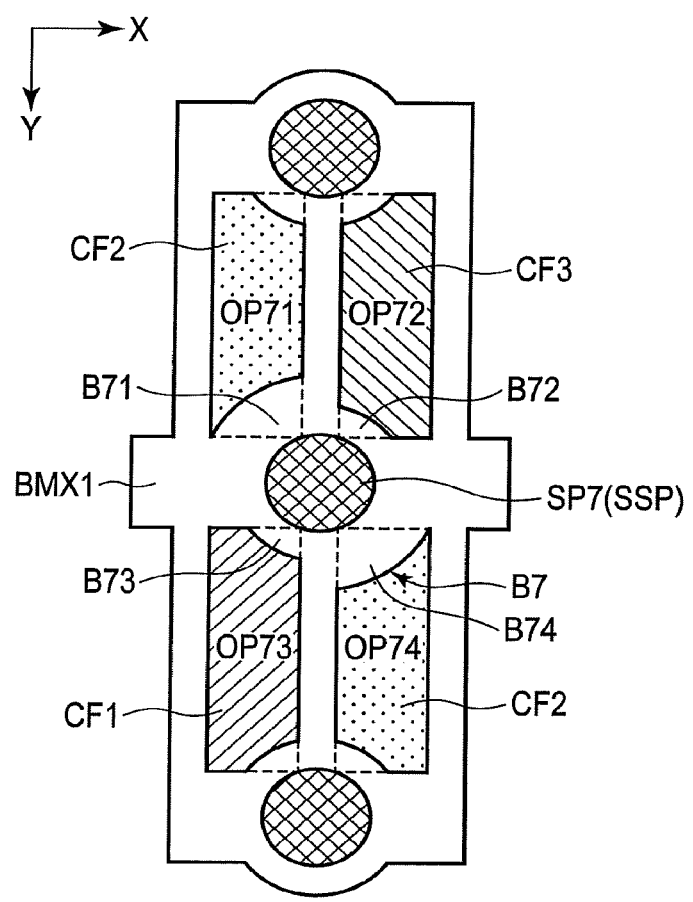
F I G. 15

DISPLAY DEVICE

CROSS-REFERENCE TO RELATED APPLICATIONS

This application is based upon and claims the benefit of priority from Japanese Patent Application No. 2017-075159, filed Apr. 5, 2017, the entire contents of which are incorporated herein by reference.

FIELD

Embodiments described herein relate generally to a display device.

BACKGROUND

A liquid crystal display device comprises, for example, columnar spacers to form a predetermined gap between a pair of substrates. Light leakage may occur around the spacers due to alignment failure of liquid crystal molecules and the like. For example, a technology of allowing a light-shielding layer which overlaps the spacers to have a larger area than a light-shielding layer which does not overlap the spacers, has been known as a measure against the light leakage. In addition, a technology of arranging the light-shielding layer having an expanded portion which overlaps the spacers and an expanded portion which does not overlap the spacers and reducing a difference in aperture ratio between pixels where the spacers are arranged and pixels where spacers are not arranged has also been known as the other example.

BRIEF DESCRIPTION OF THE DRAWINGS

FIG. 6A is a graph showing evaluation results of the visibility of non-uniformity in display.

FIG. 6B is a graph showing evaluation results of the visibility of non-uniformity in display.

FIG. 15 is an enlarged plan view showing the other light-shielding portion.

DETAILED DESCRIPTION

Figure 1:
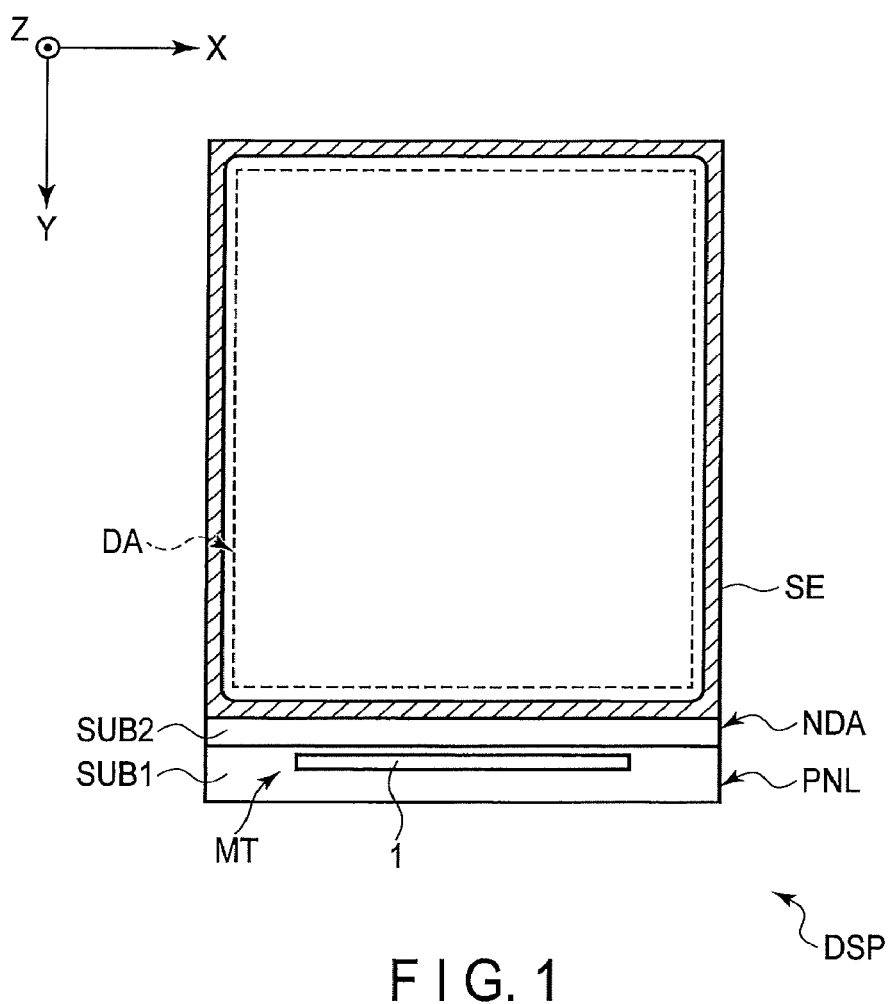
FIG. 1 is a plan view showing a configuration of a display device DSP of the embodiments.

In general, according to one embodiment, a display device comprises: a first opening portion, a third opening portion, and a fifth opening portion of a first color; a second opening portion, a fourth opening portion, and a sixth opening portion of a second color different from the first color; a first light-shielding portion; a second light-shielding portion smaller than the first light-shielding portion; and a third light-shielding portion larger than the first light-shielding portion, the first light-shielding portion being adjacent to the first and second opening portions, the first opening portion having an area larger than an area of the second opening portion, the second light-shielding portion being adjacent to the third and fourth opening portions, the third and fourth opening portions each having substantially an equal area to the first opening portion, the third light-shielding portion being adjacent to the fifth and sixth opening portions, the fifth and sixth opening portions each having substantially an equal area to the second opening portion.

According to another embodiment, a display device comprises: a first opening portion and a second opening portion adjacent to each other; a third opening portion and a fourth opening portion adjacent to each other; a fifth opening portion and a sixth opening portion adjacent to each other; a first light-shielding portion; a second light-shielding portion smaller than the first light-shielding portion; and a third light-shielding portion larger than the first light-shielding portion, the first light-shielding portion comprising a first portion adjacent to the first opening portion and a second portion adjacent to the second opening portion, the second portion having an area larger than an area of the first portion, the second light-shielding portion comprising a third portion adjacent to the third opening portion and a fourth portion adjacent to the fourth opening portion, the third portion having substantially an equal area to the first portion, the fourth portion having an area smaller than the area of the second portion, the third light-shielding portion comprising a fifth portion adjacent to the fifth opening portion and a sixth portion adjacent to the sixth opening portion, the fifth portion having an area larger than the area of the first portion, the sixth portion having substantially an equal area to the second portion.

Embodiments will be described hereinafter with reference to the accompanying drawings. The disclosure is a mere example, and arbitrary change of gist which can be easily conceived by a person of ordinary skill in the art naturally falls within the inventive scope. To more clarify the explanations, the drawings may pictorially show width, thickness, shape and the like, of each portion as compared with an actual aspect, but they are mere examples and do not restrict the interpretation of the invention. In the present specification and drawings, elements like or similar to those in the already described drawings may be denoted by similar reference numbers and their detailed descriptions may be arbitrarily omitted.

FIG. 1 is a plan view showing a configuration of a display device DSP of the embodiments. For example, the first direction X, the second direction Y, and the third direction Z are orthogonal to one another but may intersect one another at an angle other than 90 degrees. In the present specification, a position of a distal side of arrow indicating the third direction Z is called an upper position (or merely above), while a position of a side opposite to the distal end of the arrow is called a lower position (or merely below). In addition, an observation position at which the display device DSP is observed is assumed to be located on the distal side of the arrow indicating the third direction Z, and viewing from the observation position toward the X-Y plane defined by the first direction X and the second direction Y is called a planar view.

In the embodiments, a liquid crystal display device will be explained as an example of the display device. The major configuration disclosed in the embodiments can also be applied to a self-luminous display device comprising an organic electroluminescent display element, and the like, an electronic paper display device comprising an electrophoretic element, and the like, a display device employing micro-electromechanical systems (MEMS), or a display device employing electrochromism.

The display device DSP comprises a display panel PNL, a driver IC chip 1 which drives the display panel PNL, and the like. The display panel PNL is, for example, a liquid crystal display panel and comprises a first substrate SUB1, a second substrate SUB2, a sealing member SE, and a liquid crystal layer (a liquid crystal layer LC to be explained later). The second substrate SUB2 is opposed to the first substrate SUB1. The first substrate SUB1 and the second substrate SUB2 are bonded by the sealing member SE. The display panel PNL includes a display area DA on which an image is displayed and a frame-shaped non-display area NDA surrounding the display area DA. The display area DA is located on an inner side surrounded by the sealing member SE.

The driver IC chip 1 is located in the non-display area NDA. In the example illustrated, the driver IC chip 1 is mounted on a mounting portion MT of the first substrate SUB1 extending to an outer side than the second substrate SUB2. The driver IC chip 1 incorporates, for example, a display driver which outputs a signal necessary for the image display. The display driver comprises at least several parts of a signal line drive circuit SD, a scanning line drive circuit GD, and a common electrode drive circuit CD, which will be explained later. The driver IC chip 1 is not limited to the example illustrated but may be mounted on a flexible substrate connected separately to the display panel PNL.

The display panel PNL of the embodiments may be any one of a transmissive display panel having a transmissive display function of displaying an image by allowing the light from a back surface side of the first substrate SUB1 to be selectively transmitted, a reflective display panel having a reflective display function of displaying an image by allowing the light from a front surface side of the second substrate SUB2 side to be reflected selectively, and a transflective display panel having both the transmissive display function and the reflective display function.

In addition, the detailed configuration of the display panel PNL is not explained here but, any one of a display mode using a lateral electric field along the X-Y plane or the main surface of the substrate, a display mode using a longitudinal electric field along the normal of the X-Y plane, and a display mode using an inclined electric field angled with respect to the X-Y plane. Furthermore, the display panel PNL may be configured to correspond to a display mode using an arbitrary combination of the longitudinal, lateral, and tilted electric fields.

Figure 2:
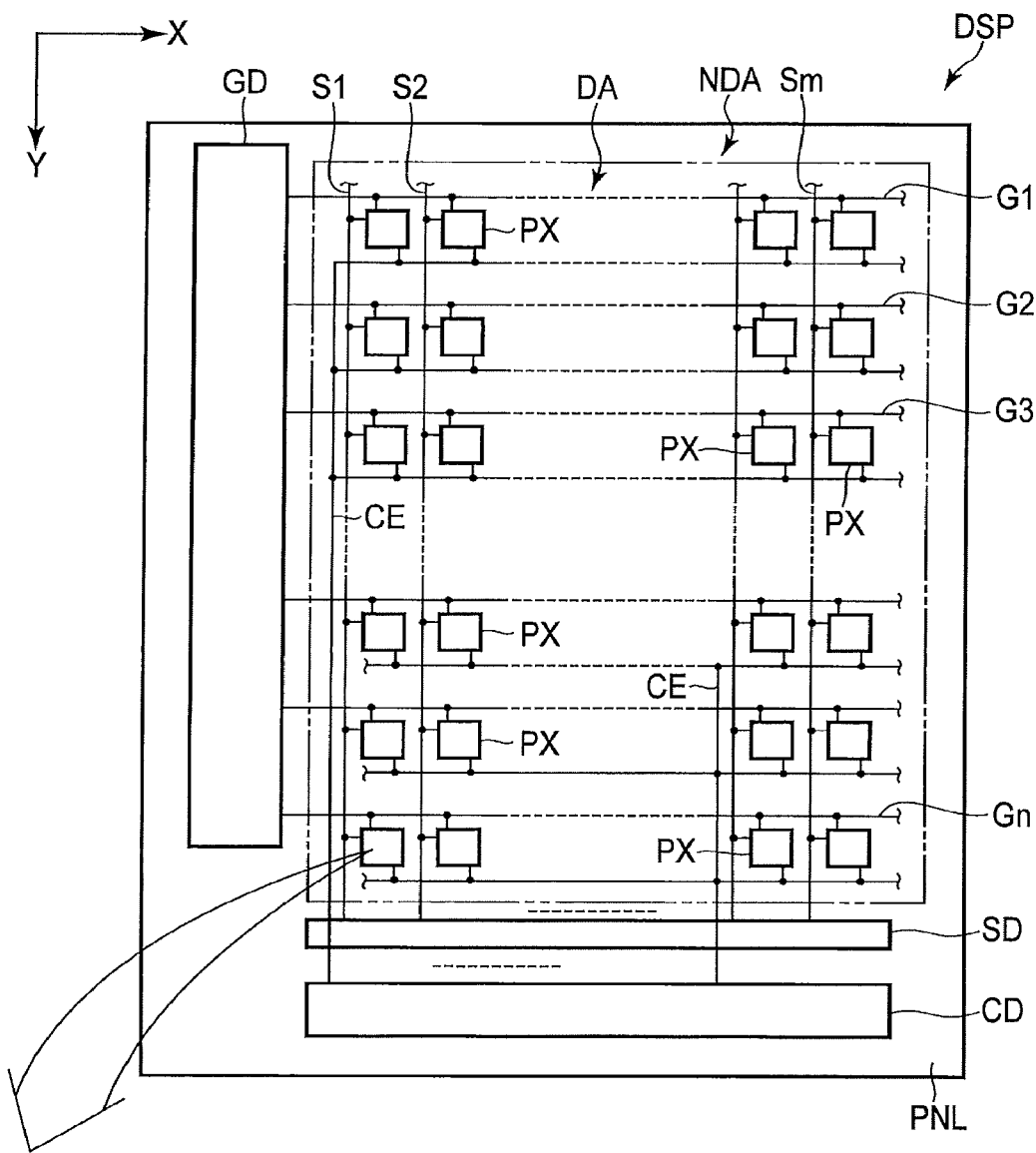
FIG. 2 is an illustration showing a basic configuration and an equivalent circuit, of the display panel PNL shown in FIG. 1.
Figure 2:
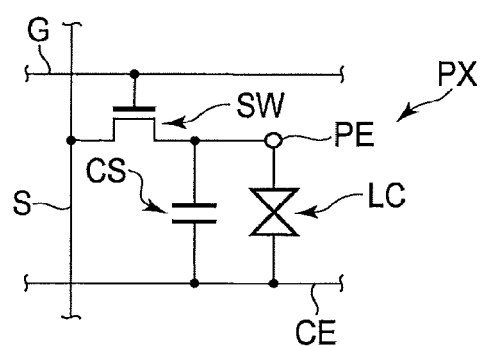

FIG. 2 is an illustration showing a basic configuration and an equivalent circuit, of the display panel PNL shown in FIG. 1. The display panel PNL comprises a plurality of pixels PX in the display area DA. The pixels PX are arrayed in a matrix. The display panel PNL comprises a plurality of scanning lines G (G1 to Gn), a plurality of signal lines S (S1 to Sm), a common electrode CE and the like, in the display area DA. The scanning lines G extend in the first direction X so as to be arranged in the second direction Y. The signal lines S extend in the second direction Y so as to be arranged in the first direction X. The scanning lines G and the signal lines S may not extend linearly, but may be partially bent. The common electrode CE is disposed across the pixels PX.

The scanning lines G are connected to the scanning line drive circuit GD. The signal lines S are connected to the signal line drive circuit SD. The common electrode CE is connected to the common electrode drive circuit CD. The signal line drive circuit SD, the scanning line drive circuit GD, and the common electrode drive circuit CD may be disposed on the first substrate SUB1 in the non-display area NDA or several parts or all parts of them may be built in the driver IC chip 1 shown in FIG. 1.

Each pixel PX comprises a switching element SW, a pixel electrode PE, the common electrode CE, a liquid crystal layer LC and the like. The switching element SW is composed of, for example, a thin-film transistor (TFT) and is electrically connected to the gate line G and the signal line S. The scanning line G is connected to the switching elements SW in the respective pixels PX arranged in the first direction X. The signal line S is connected to the switching elements SW in the respective pixels PX arranged in the second direction Y. The pixel electrode PE is electrically connected to the switching element SW. Each pixel electrode PE is opposed to the common electrode CE and drives the liquid crystal layer LC by an electric field generated between the pixel electrode PE and the common electrode CE. A storage capacitor CS is formed, for example, between an electrode having the same potential as en electric potential of the common electrode CE and an electrode having the same potential as an electric potential of the pixel electrode PE. The scanning lines G, the signal lines S, the switching elements SW, the pixel electrodes PE, the common electrodes CE, and the like are disposed on the first substrate SUB1 shown in FIG. 1.

Figure 3:
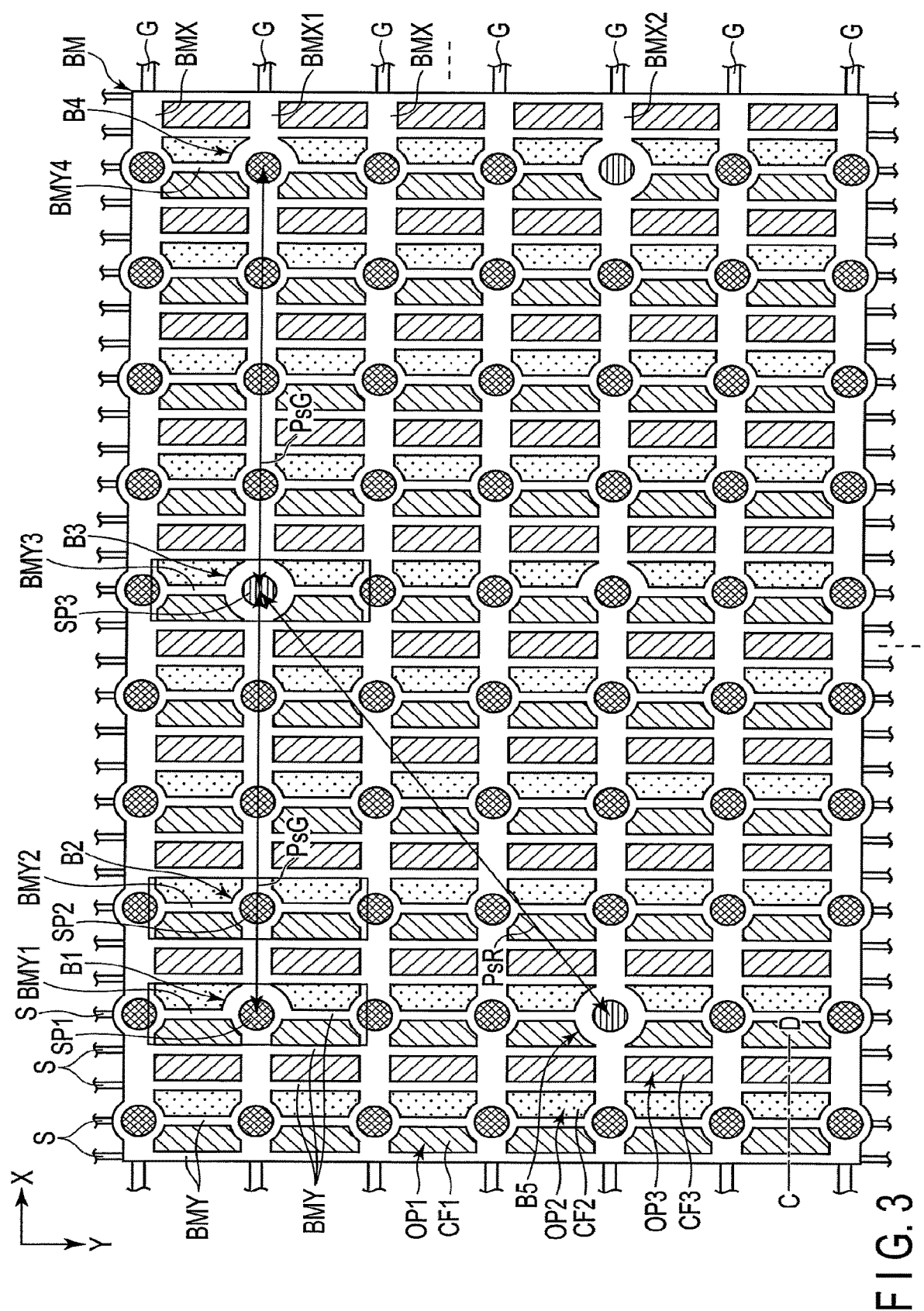
FIG. 3 is a plan view showing an arrangement example of a light-shielding layer BM, a color filter CF, and a spacer SP.

FIG. 3 is a plan view showing an arrangement example of a light-shielding layer BM, a color filter CF, and a spacer SP. FIG. 3 is a plan view in the X-Y plane. The light-shielding layer BM and the color filter CF are provided on the second substrate SUB2 shown in FIG. 1.

In the example illustrated, the light-shielding layer BM is formed in a grating shape, and comprises portions BMX and BMY. The light-shielding layer BM may be configured to have a shape other than the grating shape such as a ladder shape, in the structure comprising the portions BMX and BMY. The portions BMX are spaced apart from each other and arranged in the second direction Y, and extend in the first direction X. The portions BMX overlap the scanning lines G in planar view, respectively. Each of the portions BMX is formed in a stripe shape having a substantially constant width in the second direction Y. The portions BMY are spaced apart from each other and arranged in the first direction X, and extend in the second direction Y. The portions BMY overlap the signal lines S in planar view, respectively. Each of the portions BMY is formed in a stripe shape having a substantially constant width in the first direction X.

Opening portions OP are sectioned by the light-shielding layer BM and arrayed in a matrix in the first direction X and second direction Y. For example, the opening portions OP comprise opening portions OP1, opening portions OP2, and opening portions OP3. The opening portions OP1 to OP3 are color pixels displaying mutually different colors. Color filters CF1 of a first color are disposed at the opening portions OP1, color filters CF2 of a second color are disposed at the opening portions OP2, and color filters CF3 of a third color are disposed at the opening portions OP3. The first, second, and third colors are mutually different colors. For example, the color filters CF1 are red color filters, the color filters CF2 are green color filters, and the color filters CF3 are blue color filters. In the figure, the color filters CF1 are represented by upward-sloping hatch lines, the color filters CF2 are represented by dots, and the color filters CF3 are represented by downward-sloping hatch lines. Selection of the colors of the color filters CF1 to CF3 is not limited to the example illustrated.

The opening portions OP1 corresponding to the first color pixels, the opening portions OP2 corresponding to the second color pixels, and the opening portions OP3 corresponding to the third color pixels are arranged in this order in the first direction X, and sets of the opening portions OP1 to OP3 are repeatedly arranged in the first direction X. In addition, the opening portions OP1 to OP3 are arranged in the second direction Y. For example, the opening portions OP1 correspond to red pixels, the opening portions OP2 correspond to green pixels, and the opening portions OP3 correspond to blue pixels.

The light-shielding layer BM comprises intersections at which the portions BMX and BMY intersect. Several intersections are more expanded than the width of the portions BMX and the width of the portions BMY, and correspond to light-shielding portions which overlap the spacers SP. The light-shielding portions of the embodiments are not limited to intersections at which the portions BMX and the portions BMY intersect in a cross shape, but may be intersections at which the portions BMX and the portions BMY intersect in a T letter shape or a Y letter shape. The light-shielding portions will be explained below in detail.

The light-shielding portions will be explained while focusing attention on intersections at which portion BMX1 and portions BMY1 to BMY4 intersect. The light-shielding layer BM comprises light-shielding portions B1 to B5. The light-shielding portion B1 is an intersection of the portions BMX1 and BMY1. The light-shielding portion B2 is an intersection of the portions BMX1 and BMY2. The light-shielding portion B3 is an intersection of the portions BMX1 and BMY3. The light-shielding portion B4 is an intersection of the portions BMX1 and BMY4. The light-shielding portion B5 is an intersection of the portions BMX2 and BMY1. The light-shielding portion B1 corresponds to the first light-shielding portion. The light-shielding portion B2 corresponds to the second light-shielding portion and has a smaller area than the light-shielding portion B1. The light-shielding portion B3 corresponds to the third light-shielding portion and has a larger area than the light-shielding portion B1. The light-shielding portion B4 corresponds to the fourth light-shielding portion. The light-shielding portions B1 and B4 have the same shape and the equal area. The light-shielding portion B5 corresponds to the fifth light-shielding portion. The light-shielding portions B3 and B5 have the same shape and the equal area. In the example illustrated, the light-shielding portions B1 to B4 are located in line along the first direction X. A distance between the light-shielding portions B1 and B3 in the first direction X is equal to a distance between the light-shielding portions B3 and B4 in the first direction X. In the example illustrated, three light-shielding portions having the same shape as the light-shielding portion B2 are located between the light-shielding portions B1 and B3, and three light-shielding portions having the same shape as the light-shielding portion B2 are located between the light-shielding portions B3 and B4, but the light-shielding portions are not limited to this example.

Each of the light-shielding portions B1 to B4 is adjacent to the opening portions OP1 where the color filter CF1 is disposed and the opening portions OP2 where the color filter CF2 is disposed. In other words, the light-shielding portions B1 to B4 are adjacent to the red pixels and the green pixels. The light-shielding portions B1 to B4 may be adjacent to the opening portions (red pixels) OP1 and the opening portions (blue pixels) OP3 or adjacent to the opening portions (green pixels) OP2 and the opening portions (blue pixels) OP3.

The spacer SP is disposed at a position which overlaps any one of the light-shielding portions. The spacer SP comprises a sub-spacer SSP which is remote from the first substrate SUB1 and is in contact with the second substrate SUB2, and a main spacer MSP which is in contact with the first substrate SUB1 and the second substrate SUB2, as explained later. In the drawing, the sub-spacer SSP is represented by inclined cross lines, and the main spacer MSP is represented by lateral lines. A spacer SP1 which overlaps the light-shielding portion B1 is a sub-spacer corresponding to a first spacer. A spacer SP2 which overlaps the light-shielding portion B2 is a sub-spacer corresponding to a second spacer. A spacer SP3 which overlaps the light-shielding portion B3 is a main spacer corresponding to a third spacer.

Figure 4:
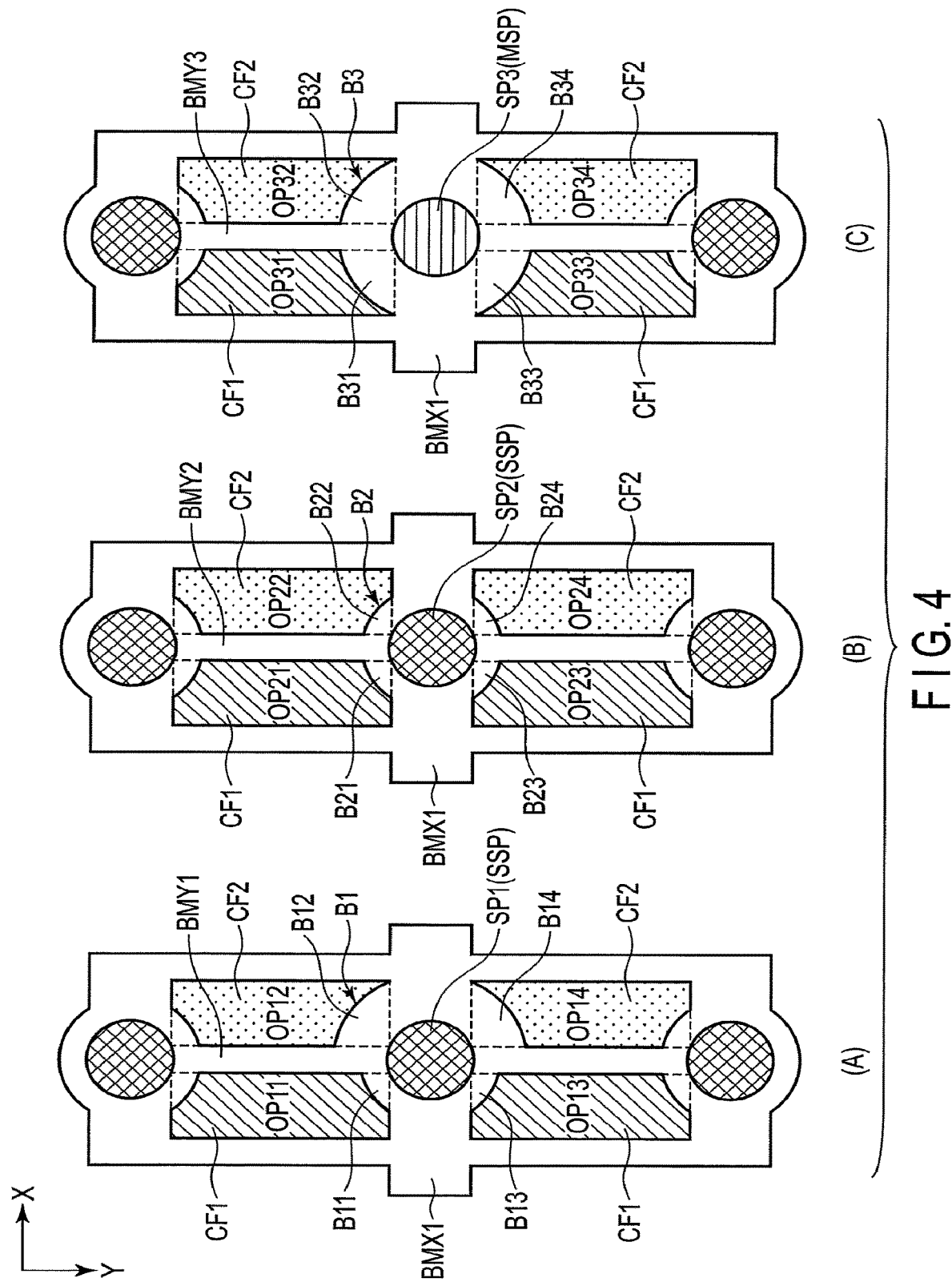
FIG. 4 is an enlarged plan view showing the light-shielding portions shown in FIG. 3.

FIG. 4 is an enlarged plan view showing the light-shielding portions shown in FIG. 3. FIG. 4(A) shows the light-shielding portion B1, the FIG. 4(B) shows the light-shielding portion B2, and FIG. 4(C) shows the light-shielding portion B3. The light-shielding portion B4 shown in FIG. 3 is the same as the light-shielding portion B1 shown in FIG. 4(A), and the light-shielding portion B5 shown in FIG. 3 is the same as the light-shielding portion B3 shown in FIG. 4(C), and their explanations will be omitted.

The light-shielding portion B1 is adjacent to the opening portions OP11 to OP14. The opening portions OP11 and OP12 are adjacent in the first direction X, the opening portions OP13 and OP14 are adjacent in the first direction X, the opening portions OP11 and OP13 are adjacent in the second direction Y, and the opening portions OP12 and OP14 are adjacent in the second direction Y. The opening portions OP11 and OP13 have substantially the same shape and substantially the equal area. The opening portions OP12 and OP14 have substantially the same shape and substantially the equal area. However, the area of the opening portion OP11 is larger than the area of the opening portion OP12.

The light-shielding portion B1 comprises portions B11 to B14. Each of the portions B11 to B14 is connected to the portions BMX1 and BMY1. The portion B11 is adjacent to the opening portion OP11, the portion B12 is adjacent to the opening portion OP12, the portion B13 is adjacent to the opening portion OP13, and the portion B14 is adjacent to the opening portion OP14. The portion B12 has a larger area than the portion B11 and has the equal area to the portion B14. The portion B13 has the equal area to the portion B11. The portion B14 has a larger area than the portion B13. For example, the opening portion OP11 corresponds to a first opening portion, the opening portion OP12 corresponds to a second opening portion, the opening portion OP13 corresponds to a seventh opening portion, the opening portion OP14 corresponds to an eighth opening portion, the portion B11 corresponds to a first portion, the portion B12 corresponds to a second portion, the portion B13 corresponds to a seventh portion, and the portion B14 corresponds to an eighth portion.

The portions B11 to B14 are formed in a fan shape. In the light-shielding portion B1, a left half shown in the figure including the portions B11 and B13 is formed in a semicircular shape having a first radius, and a right half shown in the figure including the portions B12 and B14 is formed in a semicircular shape having a second radius larger than the first radius.

The light-shielding portion B2 is adjacent to opening portions OP21 to OP24. The opening portions OP21 to OP24 have substantially the same shape and substantially the equal area. The area of each of the opening portions OP21 to OP24 is equal to the area of the opening portion OP11. The area of each of the opening portions OP21 to OP24 is larger than the area of the opening portion OP12.

The light-shielding portion B2 comprises portions B21 to B24. Each of the portions B21 to B24 is connected to the portions BMX1 and BMY2. The portion B21 is adjacent to the opening portion OP21, the portion B22 is adjacent to the opening portion OP22, the portion B23 is adjacent to the opening portion OP23, and the portion B24 is adjacent to the opening portion OP24. The portions B21 to B24 have the equal area. However, the area of each of the portions B21 to B24 is smaller than the area of the portion B12. For example, the opening portion OP21 corresponds to a third opening portion, the opening portion OP22 corresponds to a fourth opening portion, the portion B21 corresponds to a third portion, and the portion B22 corresponds to a fourth portion.

The portions B21 to B24 are formed in a fan shape. The light-shielding portion B2 includes the portions B21 to B24 and is formed in a circular shape having the first radius.

The light-shielding portion B3 is adjacent to the opening portions OP31 to OP34. The opening portions OP31 to OP34 have substantially the same shape and substantially the equal area. The area of each of the opening portions OP31 to OP34 is equal to the area of the opening portion OP12. The area of each of the opening portions OP31 to OP34 is smaller than the area of the opening portion OP11.

The light-shielding portion B3 comprises portions B31 to B34. Each of the portions B31 to B34 is connected to the portions BMX1 and BMY3. The portion B31 is adjacent to the opening portion OP31, the portion B32 is adjacent to the opening portion OP32, the portion B33 is adjacent to the opening portion OP33, and the portion B34 is adjacent to the opening portion OP34. The portions B31 to B34 have the equal area. However, the area of each of the portions B31 to B34 is larger than the area of the portion B22 and is equal to the area of the portion B12. For example, the opening portion OP31 corresponds to a fifth opening portion, the opening portion OP32 corresponds to a sixth opening portion, the portion B31 corresponds to a fifth portion, and the portion B32 corresponds to a sixth portion.

The portions B31 to B34 are formed in a fan shape. The light-shielding portion B3 includes the portions B31 to B34 and is formed in a circular shape having the second radius larger than the first radius.

The opening portions OP11, OP13, OP21, OP23, OP31, and OP33 correspond to color pixels where the color filters CF1 of the same color are disposed. The opening portions OP12, OP14, OP22, OP24, OP32, and OP34 correspond to color pixels where the color filters CF2 of the same color are disposed. For example, the color filters CF1 are red color filters, and the color filters CF2 are green color filters. That is, the opening portions OP11, OP13, OP21, OP23, OP31, and OP33 correspond to red color pixels similarly to the opening portions OP1, and the opening portions OP12, OP14, OP22, OP24, OP32, and OP34 correspond to green color pixels similarly to the opening portions OP2. However, the color of the color filters CF1 may be blue, and the color of the color filters CF2 is not limited to green but may be the other color.

The light-shielding portion B3 overlapping the spacer SP3 which is the main spacer MSP comprises the portions B31 to B34 having large area, irrespective of the colors of the adjacent openings OP31 to OP34. The light-shielding portion B2 overlapping the spacer SP2 which is the sub-spacer SSP comprises the portions B21 to B24 having a smaller area than the portions B31, and the like, irrespective of the colors of the adjacent openings OP21 to OP24. Incidentally, since the light-shielding portion B1 overlaps the spacer SP1 which is the sub-spacer SSP, the light-shielding portion B1 may originally comprise the portions having small areas similarly to the light-shielding portion B2, but comprises portions having different areas in accordance with the colors of the adjacent opening portions in the present embodiments. In the above-explained example, the portions B12 and B14 adjacent to the opening portions OP12 and OP14 where the color filters CF2 are disposed have larger areas than the portions B11 and B13 adjacent to the opening portions OP11 and OP13 where the color filters CF1 are disposed. The reason why the light-shielding portion B2 has the above-explained shape is to suppress non-uniformity in display resulting from the difference in area between the opening portions of the same color, and that the color of the color filters CF1 and the color of the color filters CF2 are different in pitch at which the non-uniformity in display can easily be visually recognized.

In other words, the light-shielding portions having a large area similarly to the light-shielding portion B3 are periodically disposed in accordance with periodically disposed the main spacers MSP. The opening portions adjacent to the light-shielding portion B3 have a comparatively smaller area than the other opening portions. In other words, the difference in luminance may be visually recognized as periodically stripe-shaped non-uniformity in display by periodically disposed opening portions having smaller areas. Then, the present inventors have executed the evaluation of the visibility of non-uniformity in display. The evaluation of the visibility of non-uniformity in display executed by the present inventors will be hereinafter explained.

Figure 5:
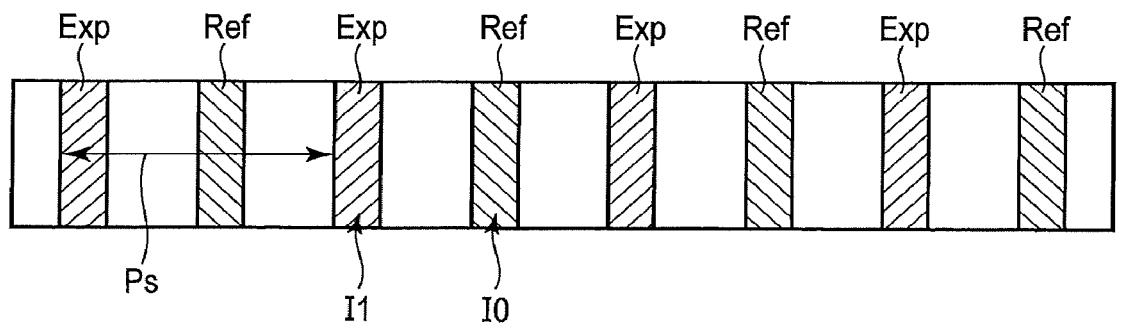
FIG. 5 is an illustration showing a method of evaluating the visibility of non-uniformity in display.

FIG. 5 is an illustration showing a method of evaluating the visibility of non-uniformity in display.

In an evaluating and testing machine, reference areas Ref and test areas Exp are arranged alternately. In addition, the test areas Exp are spaced apart from each other at an interval of pitch Ps. The reference areas Ref and the test areas Exp are areas where the same gradation of the same color is displayed. Luminance I0 of the reference areas Ref is set to be equal to that of the opening portion OP22 shown in FIG. 4(B). Luminance I1 of the test areas Exp is set to be equal to that of the opening portion OP12 shown in FIG. 4(A) and the opening portion OP32 shown in FIG. 4(C). Areas between the reference areas Ref and the test areas Exp are to be black display (0 gradations). A gamma value of the testing machine is 2.2.

It is evaluated whether the difference in luminance between the reference areas Ref and the test areas Exp is visibly recognized as non-uniformity in display or not, by using the pitch Ps and the rate of luminance difference or opening portion area difference (I0−I1)/I0 as variables, under the above-explained conditions.

FIG. 6A and FIG. 6B are graphs showing evaluation results of the visibility of non-uniformity in display. The vertical axis indicates the luminance difference (I0−I1)/I0 (%) between the reference areas Ref and the test areas Exp, and the horizontal axis indicates the pitch Ps (μm). NG indicates a condition range in which the non-uniformity in display is visibly recognized, and OK indicates a condition range in which the non-uniformity in display is not visibly recognized.

The example shown in FIG. 6A corresponds to the case in which red color (R) is displayed in the reference areas Ref and the test areas Exp, but the same result can also be obtained from the case where blue color (B) is displayed in the reference areas Ref and the test areas Exp. The example shown in FIG. 6B corresponds to the case where green color (G) is displayed in the reference areas Ref and the test areas Exp.

As a whole, in the test areas Exp, the non-uniformity in display can easily be recognized as the pitch Ps is larger and can hardly be recognized as the pitch Ps is smaller. From the viewpoint of the luminance difference rate, the pitch Ps under the condition (OK) that the non-uniformity in luminance is not visibly recognized is smaller when green color G is displayed than when red color (R) and blue color (B) are displayed, at the same luminance difference rate. For example, when the luminance difference rate is 10%, the pitch Ps is required to be 280 μm or less to display red color (R) and blue color (B) while the pitch Ps is required to be 160 μm or less to display green color (G).

In the example shown in FIG. 3, each of the light-shielding portions B1 to B3 is adjacent to the red and green opening portions. The opening portion adjacent to the light-shielding portion B3, of the red opening portions, has a smaller area than the other red opening portions. A pitch PsR of the red opening portion having such a smaller area is determined based on the evaluation result shown in FIG. 6A. Similarly, the opening portion adjacent to the light-shielding portion B3, of the green opening portions, has a smaller area than the other green opening portions. A pitch PsG of the green opening portion having such a smaller area is determined based on the evaluation result shown in FIG. 6B. From the viewpoint of suppression of the non-uniformity in display, as explained above, however, the required red pitch PsR and green pitch PsG do not match, and the required green pitch PsG is smaller than the red pitch PsR. For this reason, to implement a desired green pitch PsG, several light-shielding portions adjacent to the green opening portion need to be expanded and the area of the green opening portion needs to be smaller. Thus, as shown in FIG. 3, the light-shielding portions B1 which are light-shielding portions overlapping the sub-spacers and in which the portions adjacent to the green opening portions have a larger area than the portions adjacent to the red opening portions are desirably arranged cyclically.

The pitch in the example shown in FIG. 3 corresponds to the shortest distance in which the opening portions of the same color having a smaller area are arranged in the first direction X or the shortest distance in which the opening portions are arranged in the oblique direction intersecting the first direction X and the second direction Y. For example, the green pitch PsG of the green opening portions corresponds to the distance between the light-shielding portion B1 and the light-shielding portion B3 in the first direction X as illustrated in the drawing. In addition, the red pitch PsR of the red opening portions corresponds to the distance between the light-shielding portion B3 and the light-shielding portion B5 in the oblique direction as illustrated in the drawing. The red pitch PsR is larger than the green pitch PsG. In addition, when the light-shielding portion B3 is adjacent to the blue opening portion and the green opening portion, the pitch PsB of the blue opening portions having a smaller area is determined based on the evaluation result shown in FIG. 6A.

The embodiments comprise not only the light-shielding portion (second light-shielding portion) B2 where the sub-spacer SSP is disposed and the light-shielding portion (third light-shielding portion) B3 where the main spacer MSP is disposed, but also the light-shielding portion (first light-shielding portion) B1 where the sub-spacer SSP is disposed and which is partially expanded. The opening portion adjacent to the expanded portion of the light-shielding portion has a smaller area than the other opening portions. By cyclically disposing the light-shielding portions having the same shape as the light-shielding portion B1, the opening portions of the predetermined color can be disposed at the pitch at which the non-uniformity in display is not visually recognized, irrespective of the arrangement pitch of the main spacer MSP.

In the above-explained example, the green opening portions can be disposed at the desired pitch PsG, and non-uniformity in display can hardly be visually recognized to display green color having a higher luminous efficacy than the other colors. In addition, in the above-explained example, the light-shielding portions B1 is adjacent to the green and red opening portions. The portion adjacent to the red opening portion has the same shape as the light-shielding portion B2. For this reason, the area of the red opening portion is not reduced and the reduction in red luminance or transmittance can be suppressed as compared with a case where the light-shielding portion B1 is replaced with the light-shielding portion B3. When the light-shielding portion B1 is adjacent to the green and blue opening portions, the non-uniformity in display of green color can be suppressed and the reduction in blue luminance can be suppressed.

In the above-explained configuration example, each of the portions B11 to B14 of the light-shielding portion B1 is formed in a fan shape. However, since the light-shielding portion B1 is the light-shielding portion where the sub-spacer SSP is disposed, the light-shielding portion B1 may include at least the same shape as the light-shielding portion B2. In other words, the portions B12 and B14 adjacent to the green opening portions, of the light-shielding portion B1, does not need to be in a fan shape, but may be in the other shape. If the areas of the green opening portions OP12 and PO14 are equal to those of the opening portions OP31 and OP34, the shapes of the portions B12 and B14 are not particularly limited.

The display quality can be therefore improved.

Next, a specific configuration example of the display device according to the embodiments will be explained.

Figure 7:
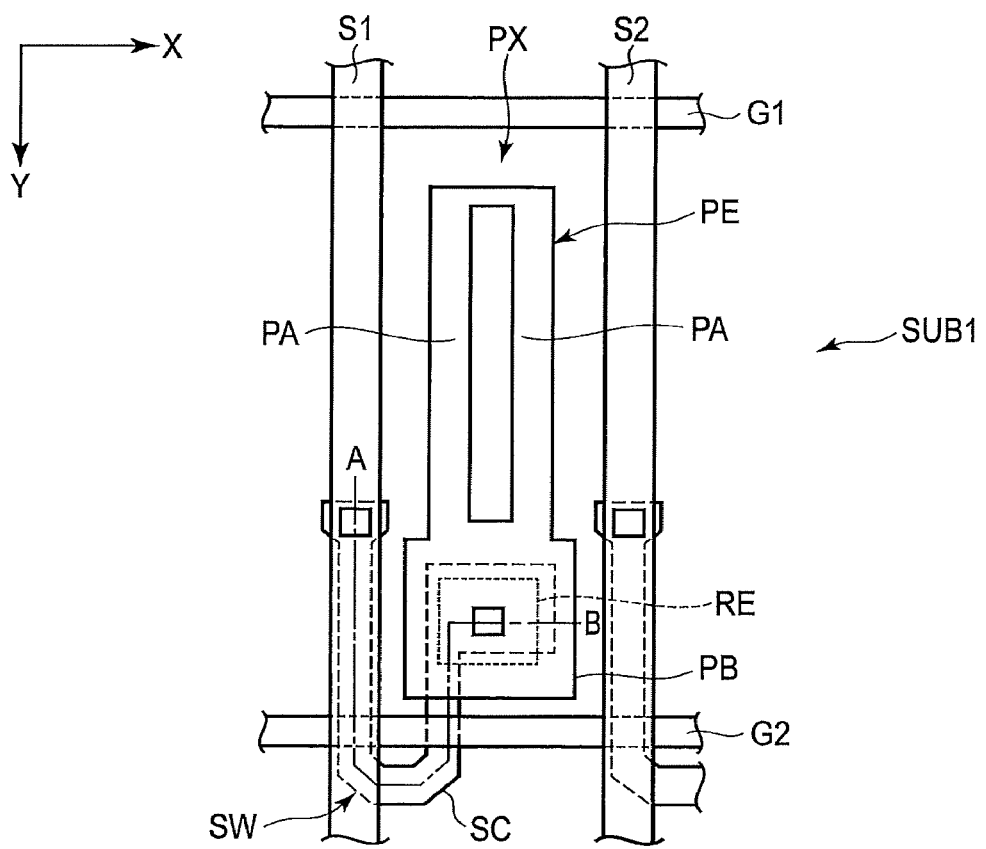
FIG. 7 is a plan view showing a configuration example of a pixel PX in a case where a first substrate SUB1 shown in FIG. 1 is seen from a second substrate SUB2 side.

FIG. 7 is a plan view showing a configuration example of a pixel PX in a case where a first substrate SUB1 shown in FIG. 1 is seen from a second substrate SUB2 side. The example illustrated corresponds to an example employing a fringe field switching (FFS) mode which is one of the display modes using the lateral electric field. The first substrate SUB1 comprises scanning lines G1 and G2, signal lines S1 and S2, a switching element SW, a pixel electrode PE, and the like. For example, the first substrate SUB1 comprises a common electrode, which is not illustrated in the figure.

The scanning lines G1 and G2 are spaced apart from each other and arranged in the second direction Y, and extend in the first direction X. The signal lines S1 and S2 are spaced apart from each other and arranged in the first direction X, and extend in the second direction Y. In the example illustrated, the pixel PX corresponds to a box-shaped area formed by the scanning lines G1 and G2 and the signal lines S1 and S2, and is shaped in a rectangle having a length in the first direction X smaller than a length in the second direction Y. The shape of the pixel PX is not limited to a rectangle but can be arbitrarily changed.

The switching element SW is electrically connected to the scanning line G2 and the signal line S1. In the example illustrated, the switching element SW has a double-gate structure. The switching element SW comprises a semiconductor layer SC and a relay electrode RE. In the semiconductor layer SC, several parts are disposed to overlap the signal line S1, and the other parts extend between the signal lines S1 and S2 to be shaped in a substantially U letter. The relay electrode RE is formed in an insular shape and disposed between the scanning lines G1 and G2 and between the signal lines S1 and S2.

The pixel electrode PE is disposed between the scanning lines G1 and G2 and between the signal lines S1 and S2. The pixel electrode PE comprises a main electrode portion PA and a contact portion PB. The main electrode portion PA and the contact portion PB are formed integrally or sequentially and are electrically connected to each other. The pixel electrode PE illustrated in the figure comprises two main electrode portions PA extending from the contact portion PB toward the scanning line G1. The main electrode portions PA extend linearly in the second direction Y. Two main electrode portions PA are arranged in the first direction X to be spaced apart from each other, and formed in a strip shape having substantially the same width in the first direction X. The contact portion PB is disposed at a position which overlaps the relay electrode RE, and is electrically connected to the relay electrode RE. The pixel electrode PE is thereby electrically connected to the switching element SW. The shape of the pixel electrode PE is not limited to the example illustrated but can be arbitrarily changed in accordance with the shape of the pixel PX. For example, the pixel electrode PE may extend in the oblique direction intersecting the first direction X and the second direction Y and the main electrode portions PA may extend in the oblique direction.

Figure 8:
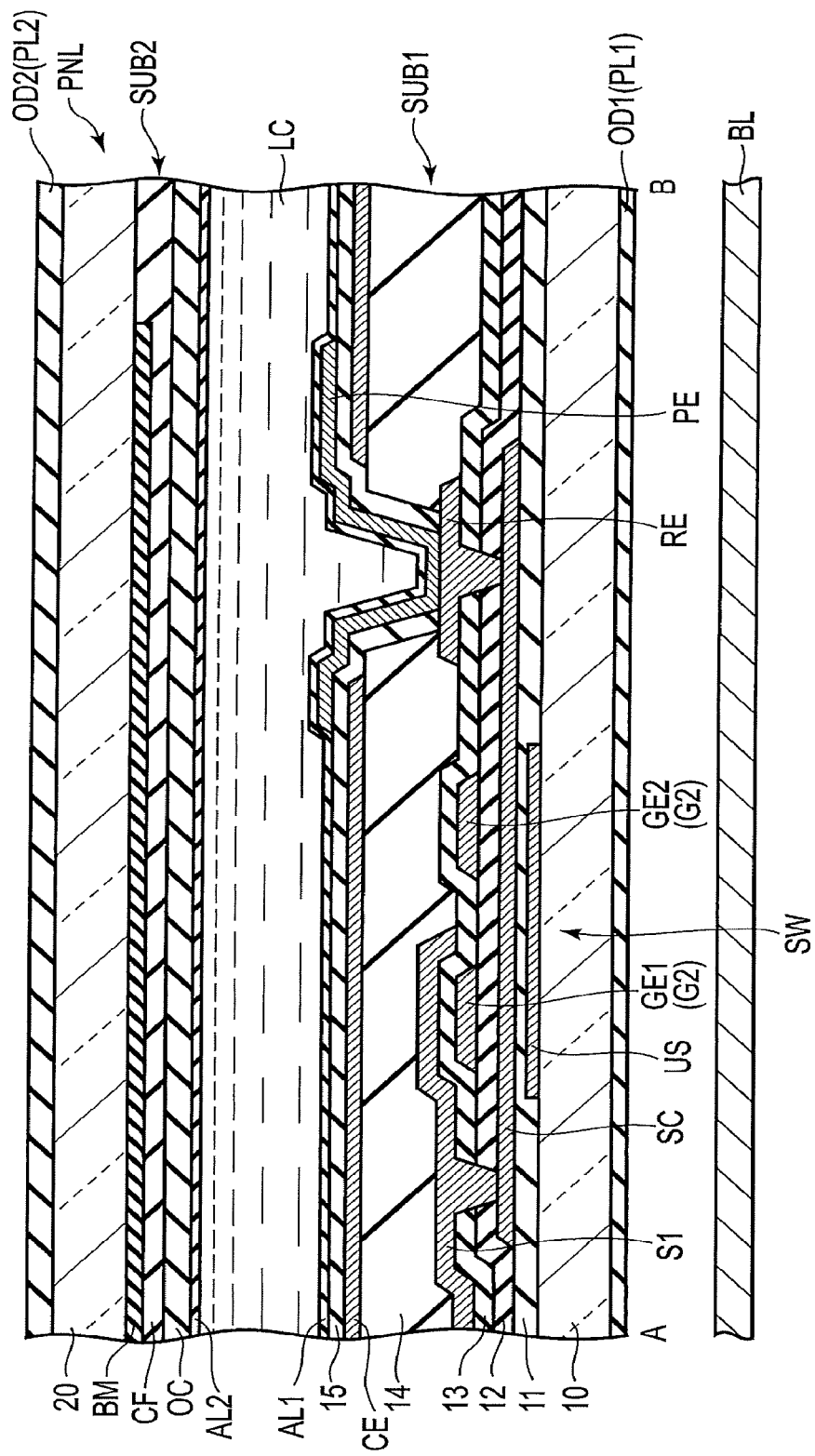
FIG. 8 is a cross-sectional view showing a partial structure of the display panel PNL cut in line A-B of FIG. 7.

FIG. 8 is a cross-sectional view showing a partial structure of the display panel PNL cut in line A-B of FIG. 7. The first substrate SUB1 comprises a first insulating substrate 10, a first insulating film 11, a second insulating film 12, a third insulating film 13, a fourth insulating film 14, a fifth insulating film 15, a lower light-shielding layer US, a semiconductor layer SC, the scanning line G2, the signal line S1, the relay electrode RE, the common electrodes CE, the pixel electrode PE, the first alignment film AL1, and the like.

The first insulating substrate 10 is a substrate having a light transmitting property such as a glass substrate or a resin substrate. The lower light-shielding layer US is located on the first insulating substrate 10 and is covered with the first insulating film 11. The lower light-shielding layer US blocks the light traveling from a backlight unit BL to the semiconductor layer SC. The semiconductor layer SC is located on the first insulating film 11 and is covered with the second insulating film 12. The semiconductor layer SC is formed of, for example, polycrystalline silicon but may be formed of amorphous silicon, an oxide semiconductor or the like.

Gate electrodes GE1 and GE2 which are parts of the scanning line G2 are located on the second insulating film 12 and covered with the third insulating film 13. The scanning line G2 is formed of a metal material such as aluminum (Al), titanium (Ti), silver (Ag), molybdenum (Mo), tungsten (W), copper (Cu) and chromium (Cr) or an alloy formed in a combination of these metal materials, and the like, and may be formed in a single-layer structure or a multi-layer structure. The lower light-shielding layer US is desirably located just under the semiconductor layer SC at the positions opposed to the gate electrodes GE1 and GE2. The signal line S1 and the relay electrode RE are located on the third insulating film 13 and are covered with the fourth insulating film 14. The signal line S1 and the relay electrode RE can be formed of the same material, and the above metal materials can be used for the formation. The signal line S1 is in contact with the semiconductor layer SC through a contact hole which penetrates the second insulating film 12 and the third insulating film 13. The relay electrode RE is in contact with the semiconductor layer SC through a contact hole which penetrates the second insulating film 12 and the third insulating film 13.

The common electrode CE is located on the fourth insulating film 14 and covered with the fifth insulating film 15. The pixel electrode PE is located on the fifth insulating film 15 and covered with the first alignment film AL1. The pixel electrodes PE is partially opposed to the common electrode CE via the fifth insulating film 15. The common electrode CE and the pixel electrodes PE are formed of a transparent conductive material such as indium-tin-oxide (ITO) or indium-zinc-oxide (IZO). The pixel electrode PE is in contact with the relay electrode RE through a contact hole which penetrates the fourth insulating film 14 and the fifth insulating film 15, at a position overlaid on the opening portion of the common electrode CE. The first insulating film 11, the second insulating film 12, the third insulating film 13, and the fifth insulating film 15 are formed of an inorganic insulating material such as a silicon oxide, a silicon nitride or a silicon oxynitride and may be formed in a single-layer structure or a multi-layer structure. The fourth insulating film 14 is an organic insulating film formed of acrylic resin or the like.

The second substrate SUB2 includes a second insulating substrate 20, the light-shielding layer BM, a color filter CF, an overcoat layer OC, a second alignment film AL2, and the like.

The second insulating substrate 20 is a substrate having a light transmitting property such as a glass substrate or a resin substrate. The light-shielding layer BM and the color filter CF are located on a side of the second insulating substrate 20, which is opposed to the first substrate SUB1. The light-shielding layer BM is formed in a grating shape as explained above and partitions the pixels. In each pixel, the inner areas partitioned by the light-shielding layer BM correspond to the above-explained opening portions and can be areas contributing to the display. For example, the light-shielding layer BM is disposed at a position opposed to each of the line portions such as the signal lines S1 and S2, the scanning lines G1 and G2, the switching element SW, and the like. The color filter CF is disposed at a position opposed to the pixel electrode PE and partially overlaps the light shielding layer BM. The color filter CF includes the color filters CF1 to CF3. The overcoat layer OC covers the color filter CF. The second alignment film AL2 covers the overcoat layer OC.

The color filter CF may be disposed on the first substrate SUB1. The light-shielding layer BM may be disposed between the color filter CF and the overcoat layer OC or between the overcoat layer OC and the second alignment film AL2. Alternatively, a pixel displaying white color may be added, a white color filter or an uncolored resin material may be disposed on the white pixel, or, not the color filter but the overcoat layer OC may be disposed.

The above-explained first substrate SUB1 and second substrate SUB2 are disposed such that the first alignment film AL1 and the second alignment film AL2 are opposed to each other. A predetermined cell gap is formed between the first alignment film AL1 and the second alignment film AL2. The cell gap is, for example, 2 to 5 μm. The first substrate SUB1 and the second substrate SUB2 are bonded to each other with a sealing member in a state in which the predetermined cell gap is formed.

The liquid crystal layer LC is located between the first substrate SUB1 and second substrate SUB2 and held between the first alignment film AL1 and the second alignment film AL2. The liquid crystal layer LC contains liquid crystal molecules. The liquid crystal layer LC is formed of a liquid crystal material of a positive type (positive dielectric anisotropy) or a negative type (negative dielectric anisotropy).

A first optical element OD1 comprising a first polarizer PL1 is disposed below the first substrate SUB1 with respect to the display panel PNL having the above configuration. In addition, a second optical element OD2 comprising a second polarizer PL2 is disposed above the second substrate SUB2. For example, the first polarizer PL1 and the second polarizer PL2 are disposed such that their absorption axes are orthogonal to each other in the X-Y plane. Each of the first optical element OD1 and the second optical element OD2 may comprise a retardation plate such as a quarter-wave plate or a half-wave plate, a scattering layer, an antireflective layer and the like as needed.

In this configuration example, the liquid crystal molecules contained in the liquid crystal layer LC are subjected to initial alignment in a predetermined direction between the first alignment film AL1 and the second alignment film AL2, in an OFF state in which an electric field is not formed between the pixel electrode PE and the common electrode CE. In such an OFF state, the light emitted from the backlight unit BL toward the display panel PNL is absorbed by the first optical element OD1 and the second optical element OD2 to execute dark display. In contrast, in an ON state in which an electric field is formed between the pixel electrode PE and the common electrode CE, the liquid crystal molecules are aligned in a direction different from the initial alignment direction by the electric field and the alignment direction is controlled by the electric field. In such an ON state, the light emitted from the backlight unit BL is partially transmitted through the first optical element OD1 and the second optical element OD2 to execute bright display.

Figure 9:
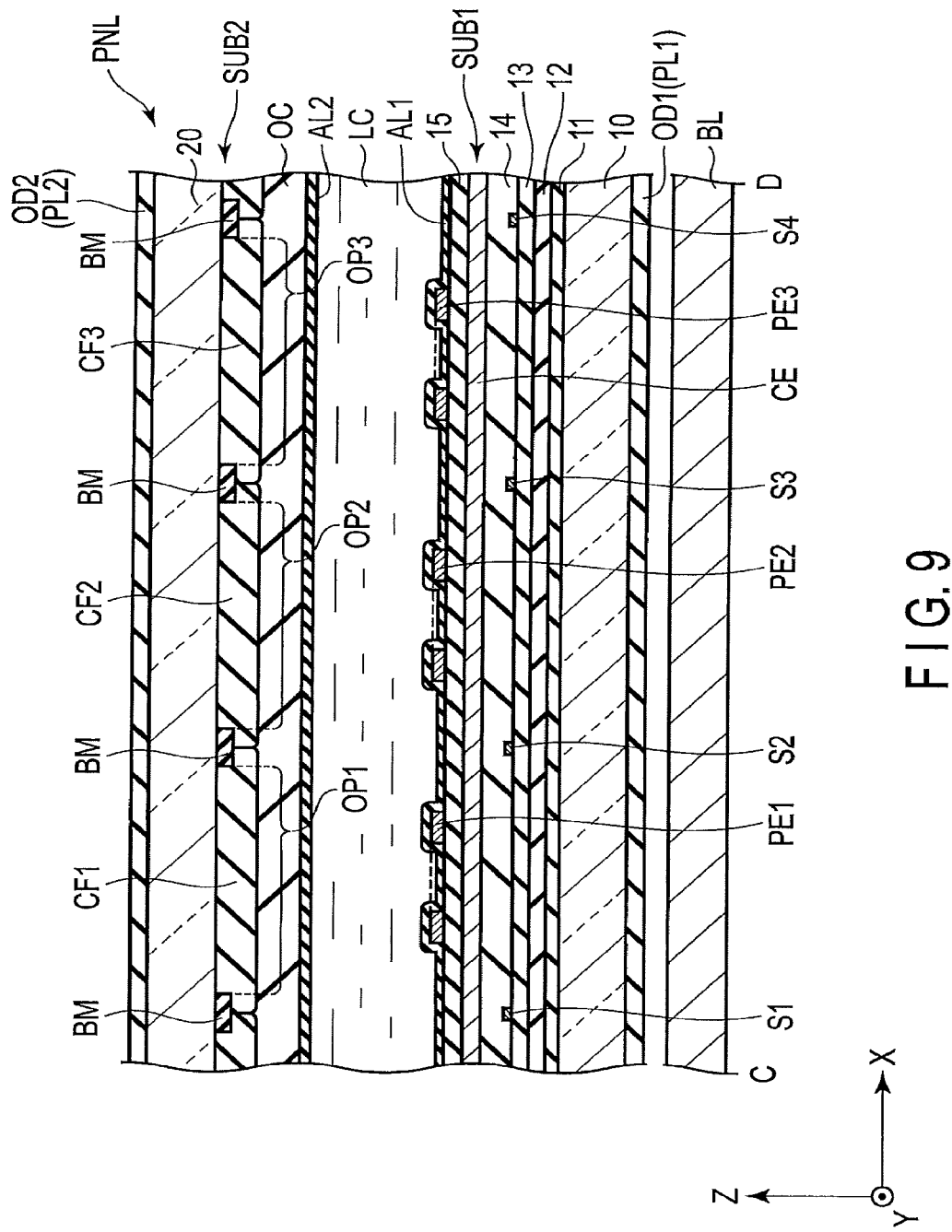
FIG. 9 is a cross-sectional view showing a configuration example of the display panel PNL cut in line C-D of FIG. 3.

FIG. 9 is a cross-sectional view showing a configuration example of the display panel PNL cut in line C-D of FIG. 3. In the first substrate SUB1, the signal lines S1 to S4 are located between the third insulating film 13 and the fourth insulating film 14. The common electrode CE is located between the fourth insulating film 14 and the fifth insulating film 15. Pixel electrodes PE1 to PE3 are located between the fifth insulating film 15 and the first alignment film AL1.

In the second substrate SUB2, the light-shielding layer BM is opposed to each of the signal lines S1 to S4. The color filters CF1 to CF3 are opposed to the pixel electrodes PE1 to P3, respectively. The overcoat layer OC covers the color filters CF1 to CF3.

Figure 10:
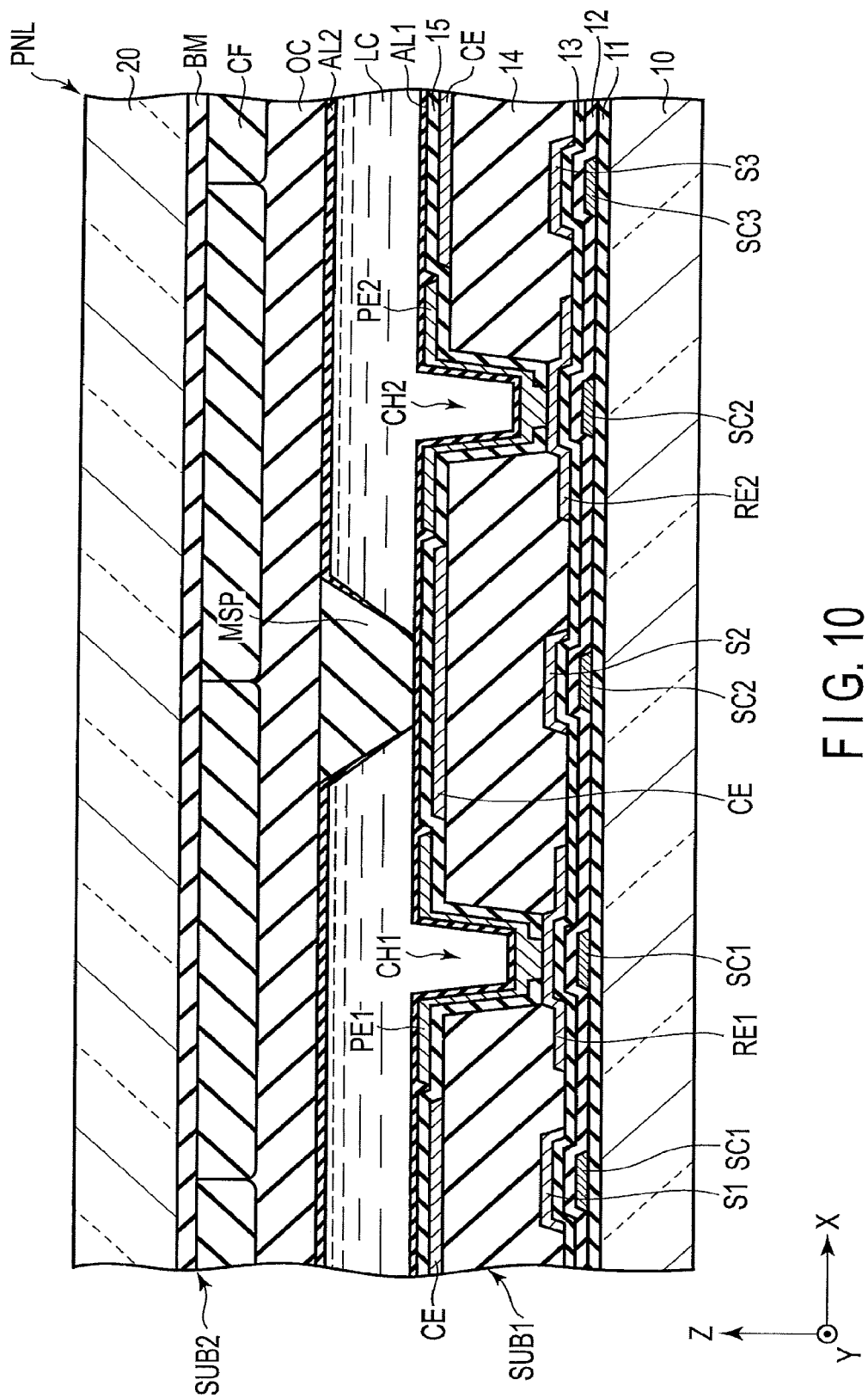
FIG. 10 is a cross-sectional view showing the configuration example of the display panel PNL including a main spacer MSP shown in FIG. 3 and the like as cut along the first direction X.

FIG. 10 is a cross-sectional view showing the configuration example of the display panel PNL including a main spacer MSP shown in FIG. 3 and the like as cut along the first direction X.

The main spacer MSP is located between the first substrate SUB1 and the second substrate SUB2. The main spacer MSP in the example illustrated is provided in the second substrate SUB2 and is in contact with the first substrate SUB1 to form a predetermined cell gap between the first substrate SUB1 and the second substrate SUB2. More specifically, the main spacer MSP is located on a side of the overcoat layer OC, which is opposed to the first substrate SUB1, and is in contact with the first alignment film AL1.

In the figure, the pixel electrode PE1 is connected to the relay electrode RE1 through the contact hole CH1, and the pixel electrode PE2 is connected to the relay electrode RE2 through the contact hole CH2. In addition, a semiconductor layer SC1 is connected to the relay electrode RE1, and a semiconductor layer SC2 is connected to the relay electrode RE2, though their detailed illustration is omitted. The structure of connection between the semiconductor layer and the relay electrode has been explained with reference to FIG. 8.

Figure 11:
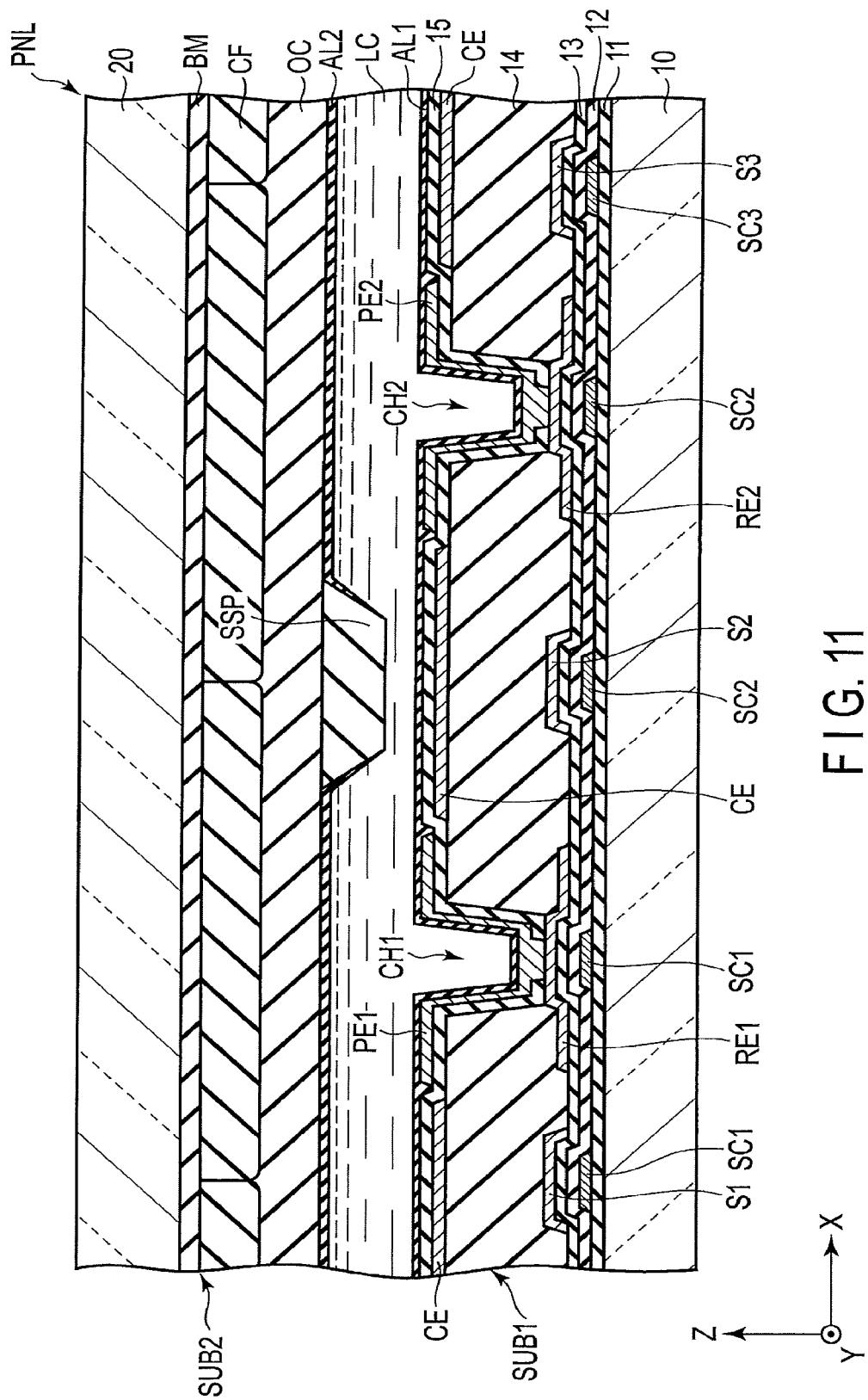
FIG. 11 is a cross-sectional view showing the configuration example of the display panel PNL including a sub-spacer SSP shown in FIG. 3 and the like as cut along the first direction X.

FIG. 11 is a cross-sectional view showing the configuration example of the display panel PNL including the sub-spacer SSP shown in FIG. 3 and the like as cut along the first direction X.

The sub-spacer SSP is located between the first substrate SUB1 and the second substrate SUB2. The sub-spacer SSP in the example illustrated is provided in the second substrate SUB2. More specifically, the sub-spacer SSP is located on a side of the overcoat layer OC, which is opposed to the first substrate SUB1, and the liquid crystal layer LC is intervened between the sub-spacer SSP and the first alignment film AL1. The sub-spacer SSP is remote from the first substrate SUB1 in a steady state in which an external stress is not applied to the display panel PNL as shown in the figure but, when a local impulse is applied from the outside to the display panel PNL, the display panel PNL absorbs the impulse by contacting the first substrate SUB1. The resistance to compression deformation can be thereby improved when an impulse is applied from the outside.

Each of the main spacer MSP shown in FIG. 10 and the sub-spacer SSP shown in FIG. 11 can be formed of a resin material. For example, the main spacer MSP and the sub-spacer SSP can be formed of the same resin material as the overcoat layer OC, and can be formed together with the overcoat layer OC.

Next, the other configuration example will be explained. The same constituent elements as those of the above-explained configuration example are denoted by the same reference numerals and their explanations are omitted.

Figure 12:
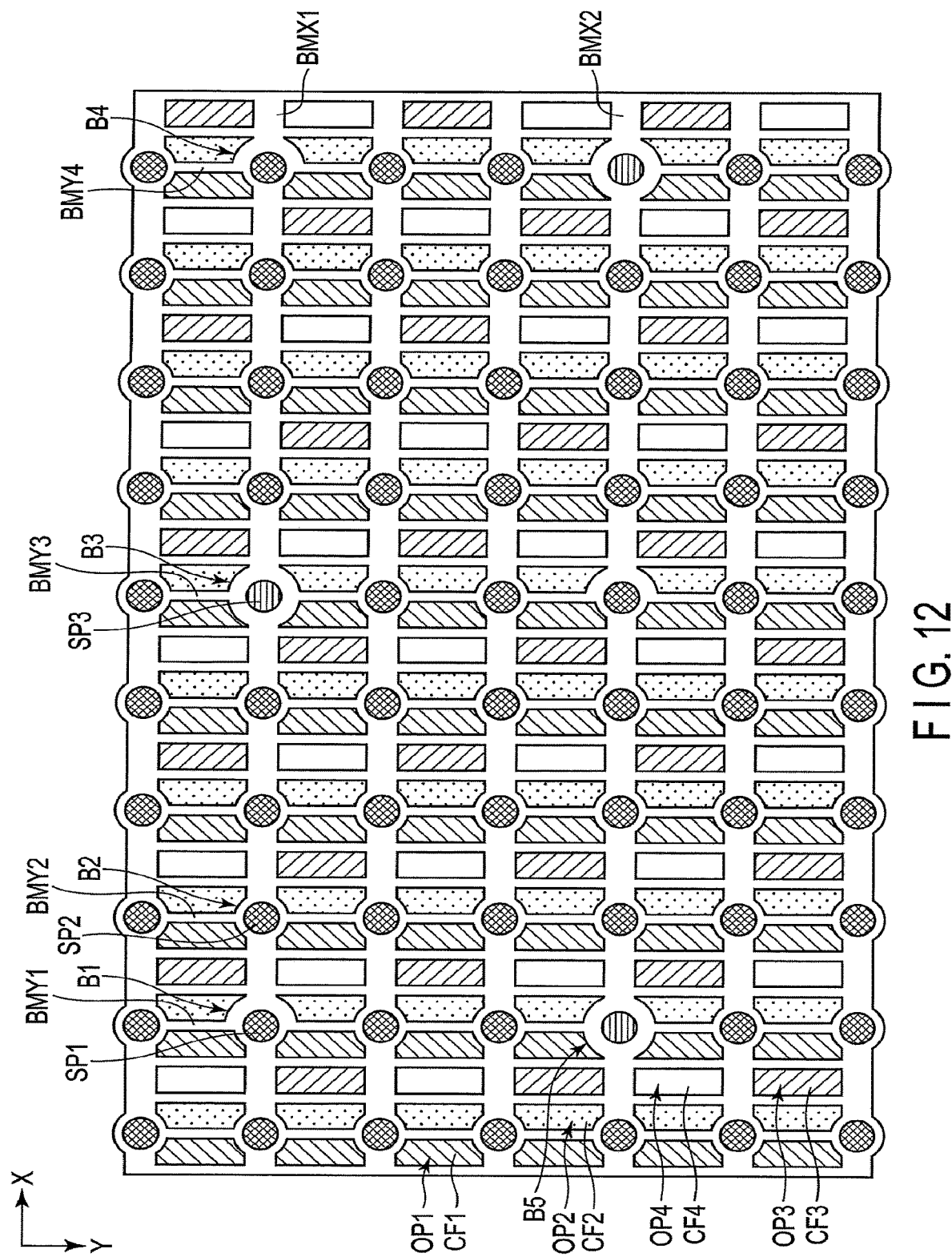
FIG. 12 is a plan view showing the other arrangement example of the light-shielding layer BM, the color filter CF, and the spacer SP.

FIG. 12 is a plan view showing the other arrangement example of the light-shielding layer BM, the color filter CF, and the spacer SP.

The arrangement example shown in FIG. 12 is different from the arrangement example shown in FIG. 3 with respect to a feature that the opening portions OP3 where the color filter CF3 is disposed and an opening portion OP4 where a color filter CF4 is disposed are alternately arranged in the second direction Y. The opening portion OP4 corresponds to, for example, a white pixel and the color of the color filter CF4 is white or transparent.

The light-shielding portion B1 is disposed at an intersection of the portions BMY1 and BMX1, the light-shielding portion B2 is disposed at an intersection of the portions BMY1 and BMX2, the light-shielding portion B3 is disposed at an intersection of the portions BMY1 and BMX3, the light-shielding portion B4 is disposed at an intersection of the portions BMY1 and BMX4, and the light-shielding portion B5 is disposed at an intersection of the portions BMY2 and BMX1. The light-shielding portions B1 to B5 correspond to the light-shielding portions B1 to B5 shown in FIG. 3, respectively. The light-shielding portions B1 to B5 are adjacent to, for example, the opening portions OP1 which are red pixels and the opening portions OP2 which are green pixels. The color pixels to which the light-shielding portions B1 to B5 are adjacent are not limited to the above examples.

In this arrangement example, too, the pitch PsR (or the pitch PsB) of the red (or blue) opening portions each having a small area is determined based on the evaluation result shown in FIG. 6A, and the pitch PsG of the green opening portions each having a small area is determined based on the evaluation result shown in FIG. 6B. The same advantages as those of the above-explained arrangement example can be therefore obtained.

Figure 13:
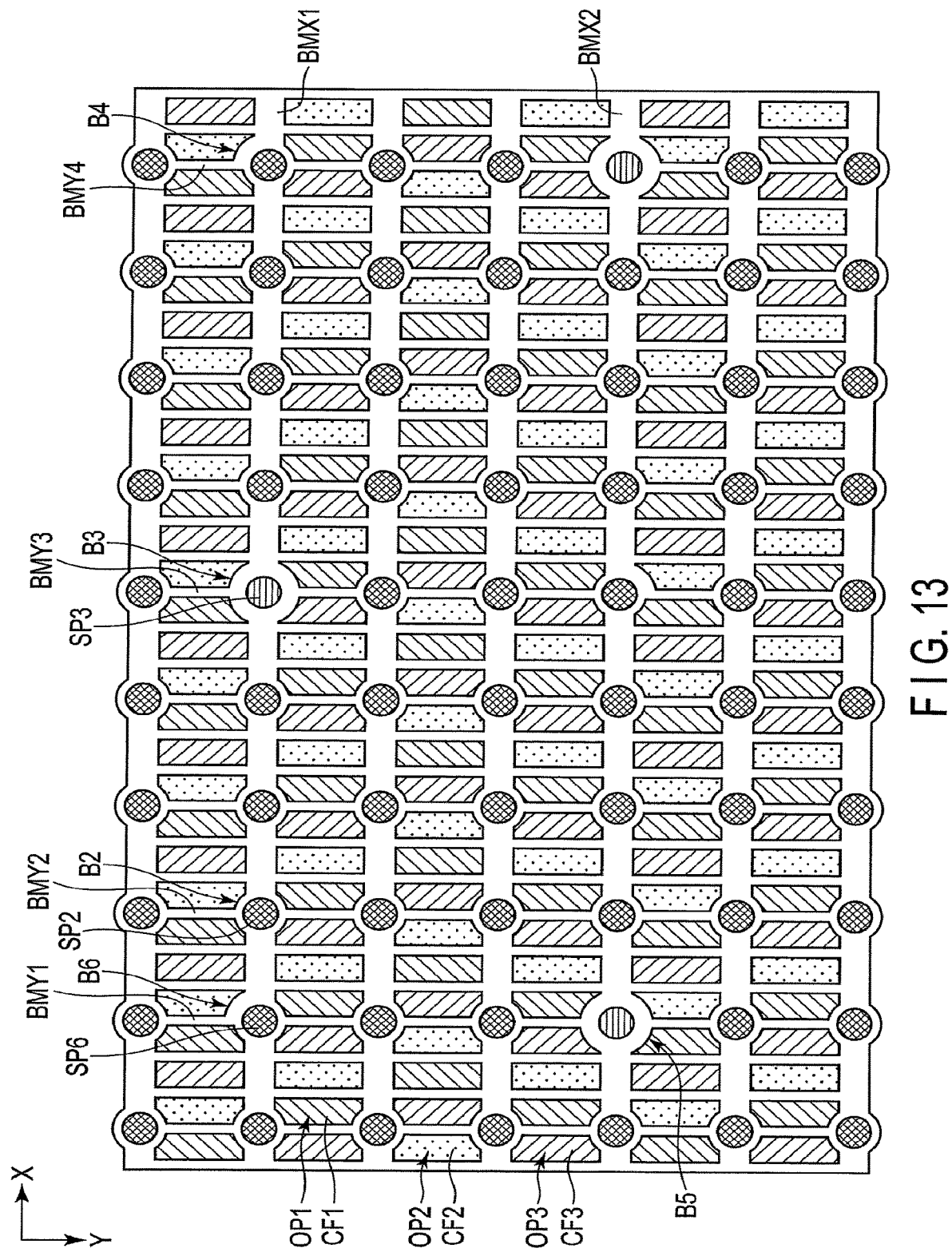
FIG. 13 is a plan view showing yet another arrangement example of the light-shielding layer BM, the color filter CF, and the spacer SP.

FIG. 13 is a plan view showing yet another arrangement example of the light-shielding layer BM, the color filter CF, and the spacer SP.

The arrangement example shown in FIG. 13 is different from the arrangement example shown in FIG. 3 with respect to features that the opening portions OP1 to OP3 having different colors are arranged in not only the first direction X, but also the second direction Y and that one light-shielding portion is adjacent to three types of opening portions OP1 to OP3. The light-shielding portion B2 where the spacer SP2 serving as the sub-spacer SSP is disposed and the light-shielding portion B3 where the spacer SP3 serving as the main spacer MSP is disposed are formed in a circular shape and correspond to the light-shielding portions B2 and B3 shown in FIG. 3, respectively. The light-shielding portion B1 where the spacer SP2 serving as the sub-spacer SSP is disposed is formed in a shape different from the light-shielding portion B1 shown in FIG. 3. In the example illustrated, the light-shielding portions B2, B3, and B6 are adjacent to two opening portions OP1 which are red pixels, one opening portion OP2 which is the green pixel, and one opening portion OP3 which is the blue pixel. The combination of the light-shielding portions and the color pixels to which the light-shielding portions are adjacent is not limited to the above example.

In this arrangement example, too, the pitches PsR and PsB of the red and blue opening portions each having a small area are determined based on the evaluation result shown in FIG. 6A, and the pitch PsG of the green opening portions each having a small area is determined based on the evaluation result shown in FIG. 6B.

Figure 14:
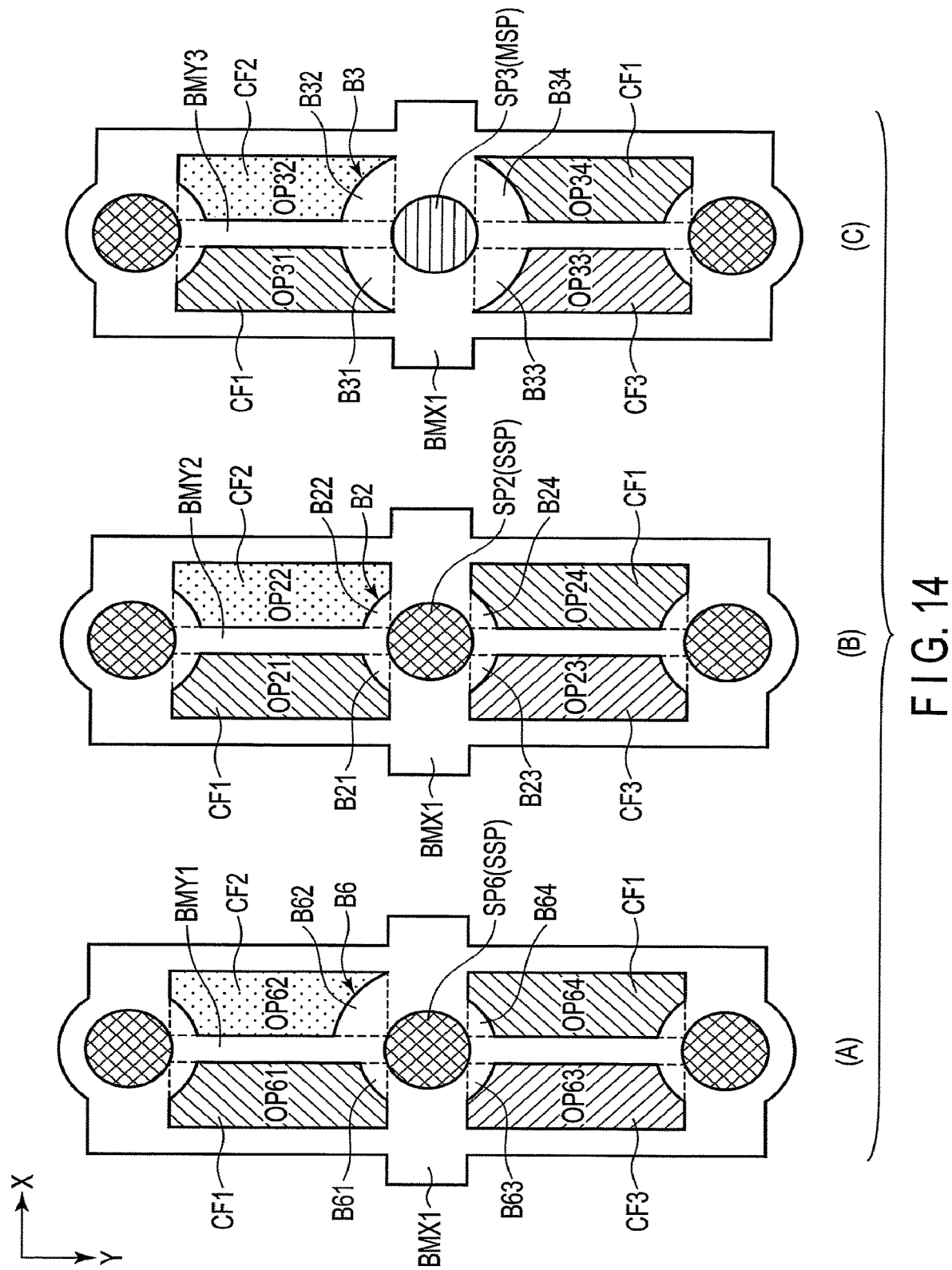
FIG. 14 is an enlarged plan view showing each of the light-shielding portions shown in FIG. 13.

FIG. 14 is an enlarged plan view showing each of the light-shielding portions shown in FIG. 13. FIG. 14(A) shows the light-shielding portion B6, the FIG. 14(B) shows the light-shielding portion B2, and FIG. 14(C) shows the light-shielding portion B3.

The light-shielding portion B6 is adjacent to opening portions OP61 to OP64. The opening portions OP61, OP63, and OP64 have substantially the same shape and substantially the equal area. The area of the opening portion OP62 is smaller than the area of the opening portion OP61.

The light-shielding portion B6 comprises portions B61 to B64. Each of the portions B61 to B64 is connected to the portions BMX1 and BMY1. The portion B61 is adjacent to the opening portion OP61, the portion B62 is adjacent to the opening portion OP62, the portion B63 is adjacent to the opening portion OP63, and the portion B64 is adjacent to the opening portion OP64. The portions B61, B63, and B64 have the equal area. The area of the portion B62 is larger than the area of the portion B61. The portions B61 to B64 are formed in a fan shape. In the light-shielding portion B6, a part including the portions B61, B63, and B64 is formed in a fan shape having a first radius, and a part including the portion B62 is formed in a fan shape having a second radius larger than the first radius.

For example, the opening portion OP61 corresponds to a first opening portion, the opening portion OP62 corresponds to a second opening portion, the opening portion OP63 corresponds to a seventh opening portion, the opening portion OP64 corresponds to an eighth opening portion, the portion B61 corresponds to a first portion, the portion B62 corresponds to a second portion, the portion B63 corresponds to a seventh portion, and the portion B64 corresponds to an eighth portion.

The light-shielding portion B2 is adjacent to opening portions OP21 to OP24. The opening portions OP21 to OP24 have substantially the same shape and substantially the equal area. However, the opening portion OP22 has an equal area to the opening portion OP62.

The light-shielding portion B2 comprises portions B21 to B24. Each of the portions B21 to B24 is connected to the portions BMX1 and BMY2. The portion B21 is adjacent to the opening portion OP21, the portion B22 is adjacent to the opening portion OP22, the portion B23 is adjacent to the opening portion OP23, and the portion B24 is adjacent to the opening portion OP24. The portions B21 to B24 have the equal area. The portions B21 to B24 are formed in a fan shape. The light-shielding portion B2 includes the portions B21 to B24 and is formed in a circular shape having the first radius.

The light-shielding portion B3 is adjacent to the opening portions OP31 to OP34. The opening portions OP31 to OP34 have substantially the same shape and substantially the equal area. The opening portion OP32 has an equal area to the opening portion OP62.

The light-shielding portion B3 comprises portions B31 to B34. Each of the portions B31 to B34 is connected to the portions BMX1 and BMY3. The portion B31 is adjacent to the opening portion OP31, the portion B32 is adjacent to the opening portion OP32, the portion B33 is adjacent to the opening portion OP33, and the portion B34 is adjacent to the opening portion OP34. The portions B31 to B34 have the equal area. The portions B31 to B34 are formed in a fan shape. The light-shielding portion B3 includes the portions B31 to B34 and is formed in a circular shape having the second radius larger than the first radius.

The opening portions OP61, OP64, OP21, OP24, OP31, and OP34 correspond to the color pixels where the color filters CF1 of the same color are disposed. The opening portions OP62, OP22, and OP32 correspond to color pixels where the color filters CF2 of the same color are disposed. The opening portions OP63, OP23, and OP33 correspond to color pixels where the color filters CF3 of the same color are disposed. For example, the color filters CF1 are red color filters, the color filters CF2 are green color filters, and the color filters CF3 are blue color filters. In other words, the opening portions OP61, OP64, OP21, OP24, OP31, and OP34 correspond to the red color pixels similarly to the opening portions OP1, the opening portions OP62, OP22, and OP32 correspond to green color pixels similarly to the opening portions OP2, and the opening portions OP63, OP23, and OP33 correspond to the blue color pixels similarly to the opening portions OP3. However, the combination of the colors of the color filters CF1 to CF3 is not limited to the above-explained example.

The light-shielding portion B3 overlapping the spacer SP3 which is the main spacer MSP comprises the portions B31 to B34 having large area, irrespective of the colors of the adjacent openings OP31 to OP34. The light-shielding portion B2 overlapping the spacer SP2 which is the sub-spacer SSP comprises the portions B21 to B24 having a smaller area than the portions B31, and the like, irrespective of the colors of the adjacent openings OP21 to OP24. In the light-shielding portion B6 overlapping the spacer SP6 which is the sub-spacer SSP, the only portion B62 adjacent to the opening portion OP62 of a specific color, i.e., green color is more expanded than the other portion B61, and the like.

In other words, as explained above, the desired pitches PsR and PsB at which non-uniformity in display is not visually recognized in the red and blue opening portions are equal to each other, and the desired pitch PsG at which non-uniformity in display is not visually recognized in the green opening portion is smaller than the pitches PsR and PsB. In the arrangement example shown in FIG. 13 and FIG. 14, the light-shielding portions where the spacers SP are disposed are adjacent to red, green, and blue opening portions. For this reason, the desired pitch can be implemented and the non-uniformity in display can be suppressed at the opening portion of any color, by comprising not only the light-shielding portions B2 and B3, but also the light-shielding portion B6. In addition, the area of the opening portion of each color is not reduced and the reduction in luminance or transmittance of each color can be suppressed by arranging the light-shielding portions at the maximum pitch of the desired pitches, in the opening portion of each color.

FIG. 15 is an enlarged plan view showing the other light-shielding portion.

A light-shielding portion B7 is adjacent to opening portions OP71 to OP74. The opening portions OP71 and OP74 have substantially the same shape and substantially the equal area. The opening portions OP72 and OP73 have substantially the same shape and substantially the equal area. However, the area of the opening portion OP71 is smaller than the area of the opening portion OP72. For example, the opening portions OP71 and OP74 correspond to green pixels comprising the color filters CF2, the opening portion OP72 corresponds to a blue pixel comprising the color filter CF3, and the opening portion OP73 corresponds to a red pixels comprising the color filter CF1.

The light-shielding portion B7 comprises portions B71 to B74. The portion B71 is adjacent to the opening portion OP71, the portion B72 is adjacent to the opening portion OP72, the portion B73 is adjacent to the opening portion OP73, and the portion B74 is adjacent to the opening portion OP74. The portions B71 and B74 have the equal area. The portions B72 and B73 have the equal area. The area of the portion B71 is larger than the area of the portion B72. The portions B71 to B74 are formed in a fan shape.

If two opening portions adjacent in the oblique direction, of four opening portions adjacent to the light-shielding portion, are the green pixels, the desired pitch PsG of the green opening portions can be implemented by application of the light-shielding portion B7. The same advantages as those of the above-explained arrangement example can be therefore obtained.

As explained above, a display device capable of suppressing the deterioration in display quality can be provided by the present embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
   a first opening portion, a third opening portion, and a fifth opening portion of a first color;
   a second opening portion, a fourth opening portion, and a sixth opening portion of a second color different from the first color;
   a first light-shielding portion;
   a second light-shielding portion smaller than the first light-shielding portion; and
   a third light-shielding portion larger than the first light-shielding portion,
   the first light-shielding portion being adjacent to the first and second opening portions,
   the first opening portion having an area larger than an area of the second opening portion,
   the second light-shielding portion being adjacent to the third and fourth opening portions,
   the third and fourth opening portions each having substantially an equal area to the first opening portion,
   the third light-shielding portion being adjacent to the fifth and sixth opening portions,
   the fifth and sixth opening portions each having substantially an equal area to the second opening portion.

2. The display device of claim 1, wherein
   the second light-shielding portion is formed in a circular shape having a first radius and the third light-shielding portion is formed in a circular shape having a second radius larger than the first radius.

3. The display device of claim 1, further comprising:
   a first substrate;
   a second substrate opposed to the first substrate; and
   first to third spacers located between the first substrate and the second substrate,
   wherein
   the first spacer and the second spacer are remote from the first substrate and are in contact with the second substrate,
   the third spacer is in contact with the first substrate and the second substrate, and
   the first spacer overlaps the first light-shielding portion, the second spacer overlaps the second light-shielding portion, and the third spacer overlaps the third light-shielding portion, in planar view.

4. The display device of claim 1, wherein
   the first color is red or blue and the second color is green.

5. The display device of claim 1, further comprising:
   a fourth light-shielding portion having substantially a same shape and substantially an equal area to the first light-shielding portion,
   wherein
   the first light-shielding portion, the third light-shielding portion, and the fourth light-shielding portion are located on a same straight line, and a distance between the first light-shielding portion and the third light-shielding portion is substantially equal to a distance between the third light-shielding portion and the fourth light-shielding portion.

6. The display device of claim 5, further comprising:
a fifth light-shielding portion having substantially a same shape and substantially an equal area to the third light-shielding portion,
wherein
a distance between the third light-shielding portion and the fifth light-shielding portion is larger than a distance between the first light-shielding portion and the third light-shielding portion.

7. The display device of claim 1, further comprising:
a seventh opening portion and an eighth opening portion adjacent to each other,
wherein
the first light-shielding portion is adjacent to the seventh opening portion and the eighth opening portion, and
the seventh opening portion has an area larger than an area of the eighth opening portion.

8. The display device of claim 7, wherein
the seventh opening portion has substantially an equal area to the first opening portion, and
the eighth opening portion has substantially an equal area to the second opening portion.

9. The display device of claim 1, further comprising:
a seventh opening portion and an eighth opening portion adjacent to each other,
wherein
the first light-shielding portion is adjacent to the seventh opening portion and the eighth opening portion, and
each of the seventh opening portion and the eighth opening portion has substantially an equal area to the first opening portion.

10. A display device comprising:
a first opening portion and a second opening portion adjacent to each other;
a third opening portion and a fourth opening portion adjacent to each other;
a fifth opening portion and a sixth opening portion adjacent to each other;
a first light-shielding portion;
a second light-shielding portion smaller than the first light-shielding portion; and
a third light-shielding portion larger than the first light-shielding portion,
the first light-shielding portion comprising a first portion adjacent to the first opening portion and a second portion adjacent to the second opening portion,
the second portion having an area larger than an area of the first portion,
the second light-shielding portion comprising a third portion adjacent to the third opening portion and a fourth portion adjacent to the fourth opening portion,
the third portion having substantially an equal area to the first portion,
the fourth portion having an area smaller than the area of the second portion,
the third light-shielding portion comprising a fifth portion adjacent to the fifth opening portion and a sixth portion adjacent to the sixth opening portion,
the fifth portion having an area larger than the area of the first portion,
the sixth portion having substantially an equal area to the second portion.

11. The display device of claim 10, wherein
the third portion has substantially the equal area to the fourth portion, and
the fifth portion has substantially the equal area to the sixth portion.

12. The display device of claim 10, further comprising:
a first color filter of a first color disposed at each of the first opening portion, the third opening portion, and the fifth opening portion; and
a second color filter of a second color disposed at each of the second opening portion, the fourth opening portion, and the sixth opening portion,
wherein
the first color is different from the second color.

13. The display device of claim 10, further comprising:
a seventh opening portion and an eighth opening portion adjacent to each other,
wherein
the first light-shielding portion further comprises a seventh portion adjacent to the seventh opening portion and an eighth portion adjacent to the eighth opening portion, and
the eighth portion has an area larger than an area of the seventh portion.

14. The display device of claim 10, wherein
the first opening portion and the second opening portion are arranged in a first direction,
the first opening portion and a seventh opening portion are arranged in a second direction intersecting the first direction, and
the second opening portion and an eighth opening portion are arranged in the second direction.

15. The display device of claim 10, further comprising:
a first color filter of a first color extending in a second direction and disposed at each of the first opening portion and a seventh opening portion; and
a second color filter of a second color extending in the second direction and disposed at each of the second opening portion and an eighth opening portion,
wherein
the first color is different from the second color.

16. The display device of claim 10, further comprising:
a seventh opening portion and an eighth opening portion adjacent to each other,
wherein
the first light-shielding portion further comprises a seventh portion adjacent to the seventh opening portion and an eighth portion adjacent to the eighth opening portion, and
each of the seventh portion and the eighth portion has an area smaller than an area of the second portion.

17. The display device of claim 16, wherein
the seventh portion has substantially the equal area to the eighth portion.

18. The display device of claim 16, further comprising:
a first color filter of a first color disposed at each of the first opening portion and the eighth opening portion;
a second color filter of a second color disposed at the second opening portion; and
a third color filter of a third color disposed at the seventh opening portion,
wherein
the first color, the second color, and the third color are different from one another.

19. The display device of claim 10, further comprising:
a fourth light-shielding portion having substantially a same shape and substantially an equal area to the first light-shielding portion,
wherein
the first light-shielding portion, the third light-shielding portion, and the fourth light-shielding portion are located on a same straight line, and
a distance between the first light-shielding portion and the third light-shielding portion is substantially equal to a distance between the third light-shielding portion and the fourth light-shielding portion.

20. The display device of claim 19, further comprising:
a fifth light-shielding portion having substantially a same shape and substantially an equal area to the third light-shielding portion,
wherein
a distance between the third light-shielding portion and the fifth light-shielding portion is substantially equal to a distance between the first light-shielding portion and the third light-shielding portion.

\* \* \* \* \*